(12) United States Patent
Lou et al.

(10) Patent No.: US 11,758,584 B2
(45) Date of Patent: *Sep. 12, 2023

(54) METHODS AND APPARATUS FOR PROTECTION OF MULTI-USER (MU) TRANSMISSIONS

(71) Applicant: INTERDIGITAL PATENT HOLDINGS, INC., Wilmington, DE (US)

(72) Inventors: Hanqing Lou, Syosset, NY (US); Oghenekome Oteri, San Diego, CA (US); Li-Hsiang Sun, San Diego, CA (US); Xiaofei Wang, Cedar Grove, NJ (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,546

(22) Filed: Apr. 5, 2021

(65) Prior Publication Data

US 2021/0289554 A1    Sep. 16, 2021

Related U.S. Application Data

(63) Continuation of application No. 16/064,281, filed as application No. PCT/US2017/012453 on Jan. 6, 2017, now Pat. No. 10,973,051.

(Continued)

(51) Int. Cl.
*H04W 74/08* (2009.01)
*H04W 72/541* (2023.01)
(Continued)

(52) U.S. Cl.
CPC ..... *H04W 74/0816* (2013.01); *H04W 72/541* (2023.01); *H04W 74/006* (2013.01); *H04W 84/12* (2013.01)

(58) Field of Classification Search
None
See application file for complete search history.

(56) References Cited

U.S. PATENT DOCUMENTS

2011/0235576 A1    9/2011    Gong et al.
2012/0026941 A1    2/2012    Ahmad et al.
(Continued)

FOREIGN PATENT DOCUMENTS

CN    101702700 A    5/2010
CN    101807954 B    1/2013
(Continued)

OTHER PUBLICATIONS

Aboul-Magd, "802.11 HEW SG Proposed PAR," IEEE 802.11-14/0165r0 (Jan. 22, 2014).

(Continued)

*Primary Examiner* — Walter J Divito
(74) *Attorney, Agent, or Firm* — Volpe Koenig

(57) ABSTRACT

Methods and apparatus for protection of multi-user (MU) transmission are described herein. An apparatus includes a receiver, a transmitter and a processor. The receiver and the processor detect a trigger frame for an uplink (UL) multi-user (MU) transmission. The processor and the transmitter generate and send a frame in response to the trigger frame and transmit channel availability information for a plurality of channels in response to the trigger frame. The receiver and the processor detect data in a resource unit (RU) of a downlink (DL) MU physical layer (PHY) protocol data unit (Continued)

(PPDU) on one of the plurality of channels. The one of the plurality of channels is based on the transmitted channel availability information.

19 Claims, 26 Drawing Sheets

Related U.S. Application Data

(60) Provisional application No. 62/276,090, filed on Jan. 7, 2016.

(51) Int. Cl.
  H04W 74/00 (2009.01)
  H04W 84/12 (2009.01)

(56) References Cited

U.S. PATENT DOCUMENTS

2016/0157266 A1  6/2016 Wang et al.
2018/0310310 A1* 10/2018 Huang .............. H04W 72/0453

FOREIGN PATENT DOCUMENTS

| EP | 3 107 223 | 12/2016 |
| EP | 3 139 626 | 5/2019 |
| WO | 2004038989 A2 | 5/2004 |
| WO | 2015/198145 | 12/2015 |

OTHER PUBLICATIONS

Aboul-Magd, "802.11 HEW SG Proposed PAR," IEEE 802.11-14/0165r1 (Mar. 17, 2014).
Aboul-Magd, "IEEE 802.11 HEW SG Proposed CSD," IEEE 802.11-14/0169r0 (Jan. 22, 2014).
Aboul-Magd, "IEEE 802.11 HEW SG Proposed CSD," IEEE 802.11-14/0169r1 (Mar. 18, 2014).
Ahn et al., "Multi Channel Availability for UL-OFDMA," IEEE 802.11-15/0612r1 (May 12, 2015).
Ahn et al., "Regarding UL MU protection," IEEE 802.11-15/1117r1 (Sep. 15, 2015).
Baron et al., "Random RU selection process upon TF-R reception," IEEE 802.11-15/1047r0 (Sep. 2015).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Sub 1 GHz License Exempt Operation, IEEE P802.11ah/D5.0 (Mar. 2015).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Huang et al., "MU-RTS/CTS Follow Up," IEEE 802.11-15/1325r0 (Nov. 9, 2015).
Huang et al., "MU-RTS/CTS for DL MU," IEEE 802.11-15/0867r1 (Jul. 14, 2015).
IEEE P802.11 ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.Nov. 2012 (Mar. 29, 2012).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Merlin et al., "Trigger Frame Format," IEEE 802.11-15/0877r1 (Jul. 13, 2015).
Ryu et al., "Trigger type specific information," IEEE 802.11-15/xxxxr0 (IEEE 802.11-15/1345r0) (Nov. 8, 2015).
Stacey, "Specification Framework for TGax," IEEE P802.11 Wireless LANs, IEEE 802.11-15/0132r13 (Dec. 7, 2015).

* cited by examiner

| Bits | Trigger Type | Length | Cascade Indication | CS Required | BW | GI And LTF Type | MU-MIMO LTF Mode | Number of HE-LTF Symbols | STBC |
|---|---|---|---|---|---|---|---|---|---|
| | 4 (1302) | 12 (1304) | 1 | 1 | 2 | 2 | 1 | 3 (1306) | 1 (1310) |

B0 B3 B4 B15 B16 B17 B18 B19 B20 B21 B22 B23 B25 B26

| Bits | LDPC Extra Symbol | AP TX Power | Packet Extension | Spatial Reuse | Doppler | HE-SIG-A Reserved | Reserved | Trigger Dependent Common Info |
|---|---|---|---|---|---|---|---|---|
| | 1 (1312) | 6 | 3 (1314) | 16 (1308) | 1 (1316) | 9 | 1 | variable |

| Bits | AID12 | RU Allocation | Coding Type | MCS | DCM | SS Allocation | Target RSSI | Reserved | Trigger Dependent User Info (#1520) |
|---|---|---|---|---|---|---|---|---|---|
| | 12 (1402) | 8 (1404) | 1 (1406) | 4 (1408) | 1 (1410) | 6 (1412) | 7 | 1 | Variable |

B0 B11 B12 B19 B20 B21 B24 B25 B26 B31 B32 B36 B39

METHODS AND APPARATUS FOR PROTECTION OF MULTI-USER (MU) TRANSMISSIONS

CROSS REFERENCE TO RELATED APPLICATIONS

This application is a continuation of U.S. patent application Ser. No. 16/064,281, filed Jun. 20, 2018, which issued on Apr. 6, 2021, which is the U.S. National Stage, under 35 U.S.C. § 371, of International Application No. PCT/US2017/012453 filed Jan. 6, 2017, which claims the benefit of U.S. Provisional Patent Application No. 62/276,090, which was filed on Jan. 7, 2016, the contents of which are hereby incorporated by reference herein.

SUMMARY

Methods and apparatus for protection of multi-user (MU) transmission are described herein. An apparatus includes a receiver, a transmitter and a processor. The receiver and the processor detect a trigger frame for an uplink (UL) multi-user (MU) transmission. The processor and the transmitter generate and send a frame in response to the trigger frame and transmit channel availability information for a plurality of channels in response to the trigger frame. The receiver and the processor detect data in a resource unit (RU) of a downlink (DL) MU physical layer (PHY) protocol data unit (PPDU) on one of the plurality of channels. The one of the plurality of channels is based on the transmitted channel availability information.

BRIEF DESCRIPTION OF THE DRAWINGS

A more detailed understanding may be had from the following description, given by way of example in conjunction with the accompanying drawings wherein:

FIG. 13 is a diagram of an example Common Information field of a trigger frame;

FIG. 14 is a diagram of an example User Information field of a trigger frame;

DETAILED DESCRIPTION

Figure 1A:
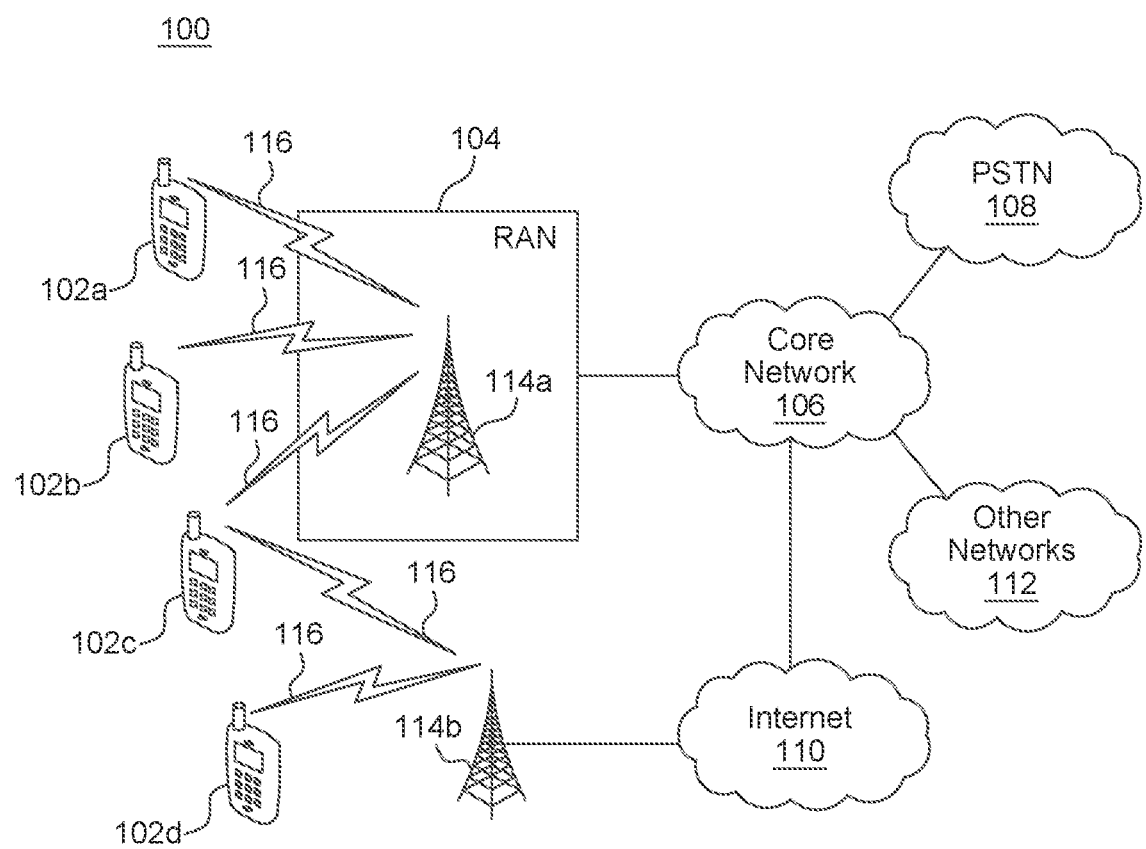
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
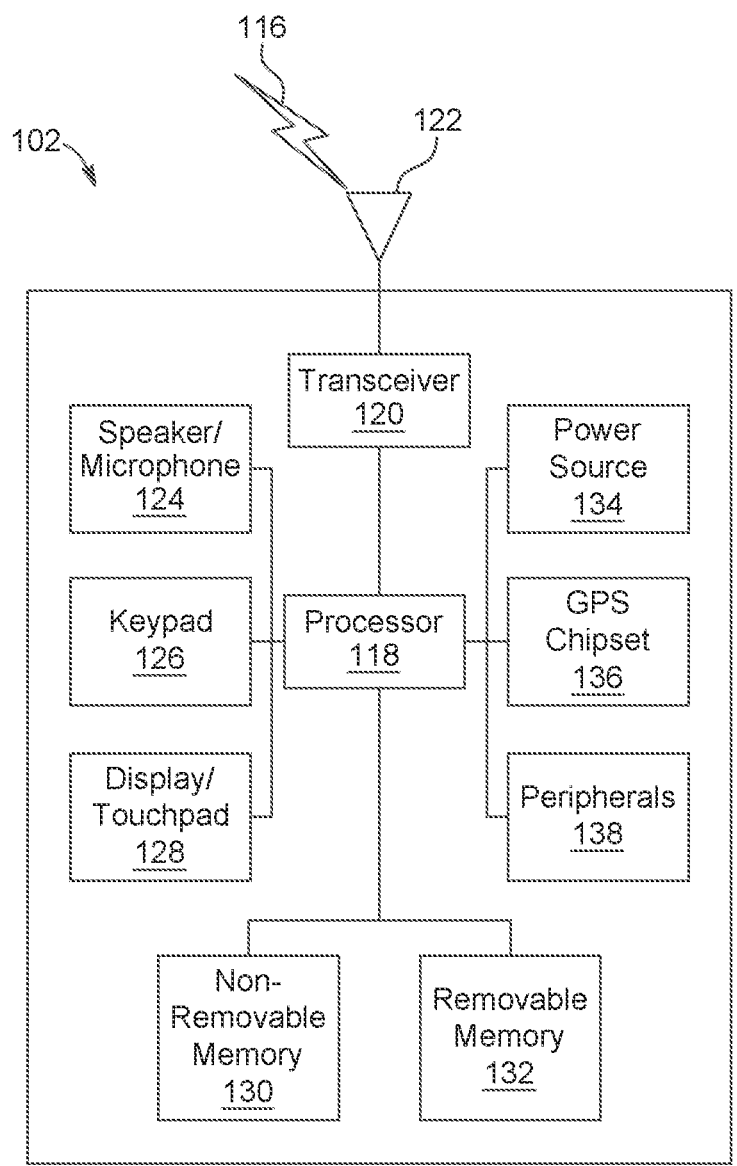
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
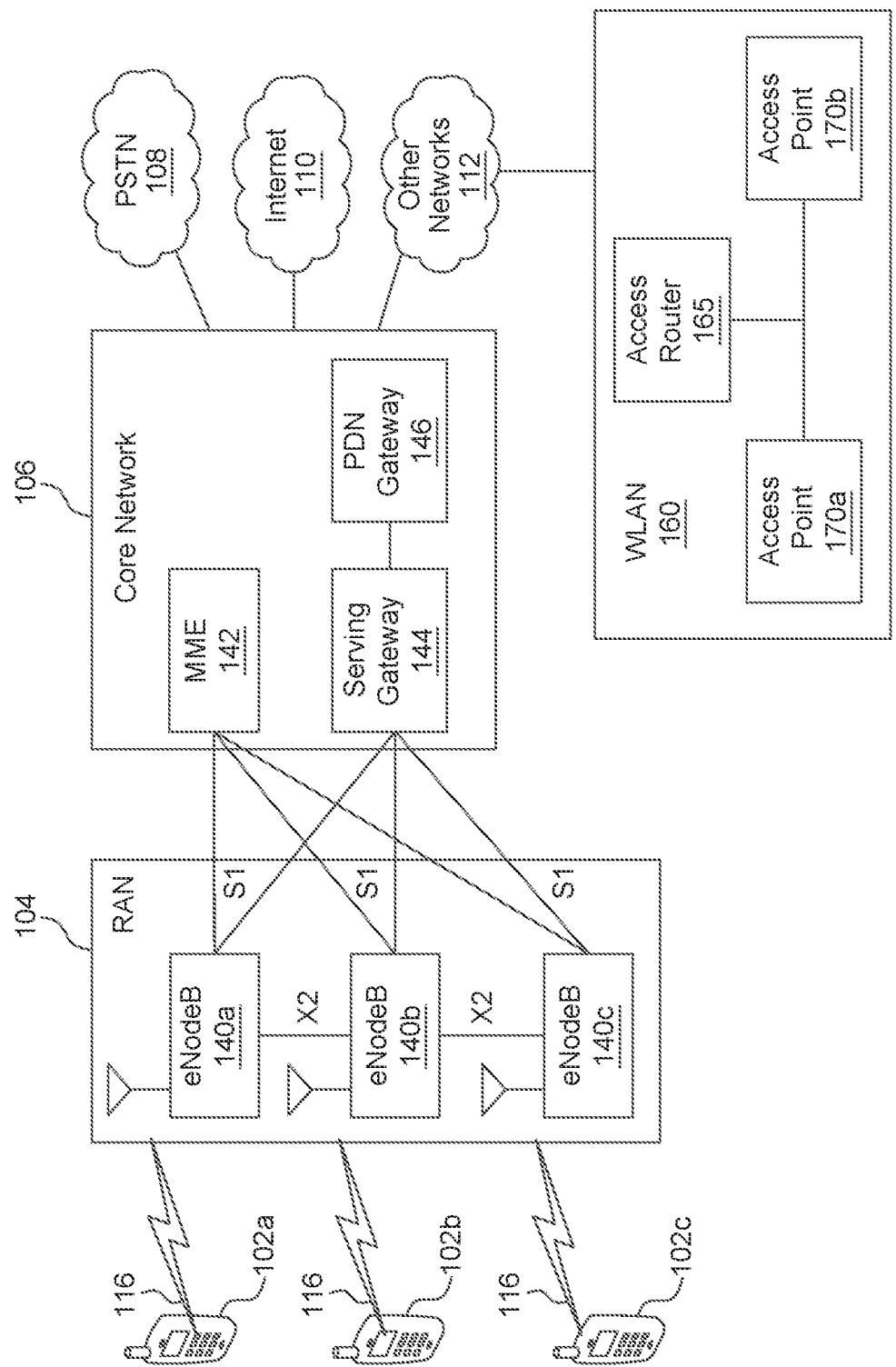
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170*a*, 170*b*. The communication between access router 165 and APs 170*a*, 170*b* may be via wired Ethernet (IEEE 802.3 standards), or any type of wireless communication protocol. AP 170*a* is in wireless communication over an air interface with WTRU 102*d*.

Institute of Electrical and Electronics Engineers (IEEE) 802.11 high efficiency (HE) wireless local area network (WLAN) (HEW) is directed toward enhancing the quality of service users experience, for example, in high density scenarios in the 2.4 GHz and 5 GHz bands. Potential applications for HEW may include, for example, data delivery for stadium events, high density scenarios such as train stations or enterprise/retail environments, video delivery and wireless services for medical applications. To enhance quality of service in these environments, HEW may take advantage of multi-user (MU) communications, including uplink (UL) and downlink (DL) OFDMA and UL and DL MU-multiple input/multiple output (MIMO)).

IEEE 802.11 uses carrier sense multiple access with collision avoidance (CSMA/CA) for channel access. CSMA/CA uses a network allocation vector (NAV) setting to maintain a prediction of future traffic on the medium based on duration information announced in request to send (RTS)/clear to send (CTS) frames prior to the actual exchange of data.

DL MU transmissions may present a hidden node problem as a result of the AP not hearing transmissions from nodes in neighboring or overlapping basic service sets (OBSSs) that may cause interference with nodes in the AP's BSS, especially for nodes at or near the edge of the AP's coverage. The RTS/CTS concept of CSMA/CA may be extended to MU DL transmissions to address the hidden node problem using MU-RTS with simultaneous CTS.

Figure 2:
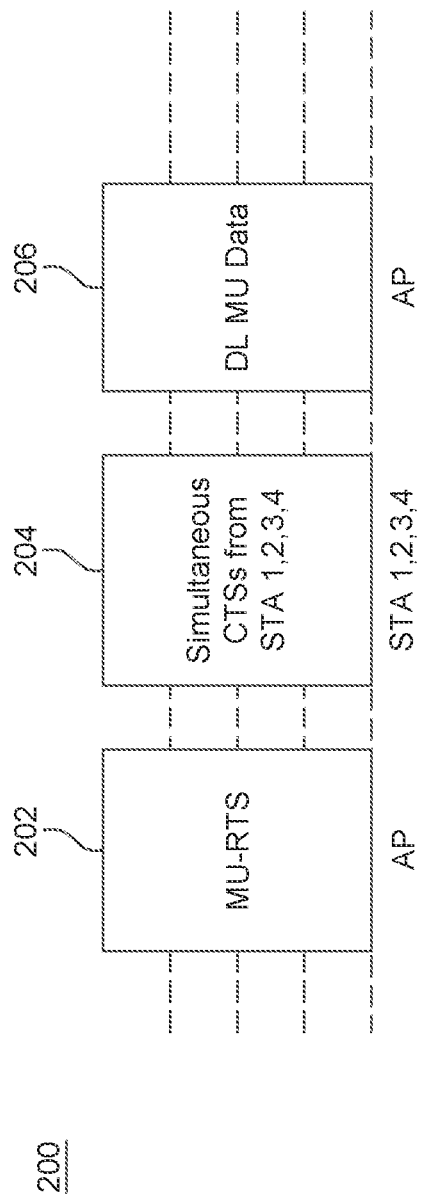
FIG. 2 is a diagram of an example of multi-user (MU) request to send (RTS) WITH simultaneous clear to send (CTS)

FIG. 2 is a diagram 200 of an example of MU-RTS with simultaneous CTS (also referred to herein as MU RTS/CTS). In the example illustrated in FIG. 2, an access point (AP) transmits an MU-RTS 202, which may be received by a number of IEEE 802 stations (STAs) (STAs 1, 2, 3 and 4 in the illustrated example). In response to the MU-RTS 202, STAs 1, 2, 3 and 4 may simultaneously transmit CTSs 204. Based on CTSs received from the STAs, the AP may transmit DL MU data 206. Although not illustrated in FIG. 2, a NAV may be set based on duration information included in the MU RTS 202, such as an indication of the duration of the TXOP initiated by the MU RTS 202.

HEW may use a similar concept to MU-RTS/CTS for UL MU transmissions by using a trigger frame to synchronize and schedule upcoming concurrent UL MU transmissions. The MU-RTS frame and the trigger frame may be variations of each other. A UL MU physical layer convergence procedure (PLOP) protocol data unit (PPDU) (MU-MIMO or OFDMA) may be sent as an immediate response to a trigger frame sent by the AP, and a NAV may be set based on duration information included in the trigger frame, such as an indication of the duration of the TXOP initiated by the trigger frame. The trigger frame may have a control frame format that carries sufficient information to identify the STAs transmitting the UL MU PPDUs and allocate resources for the UL MU PPDUs.

Figure 3:
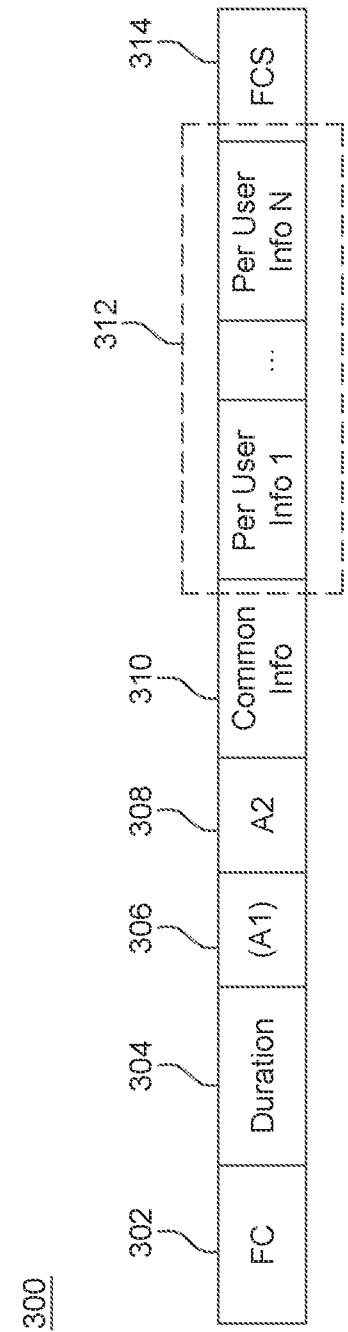
FIG. 3 is a diagram of an example trigger frame format for MU transmissions.
Figure 4:
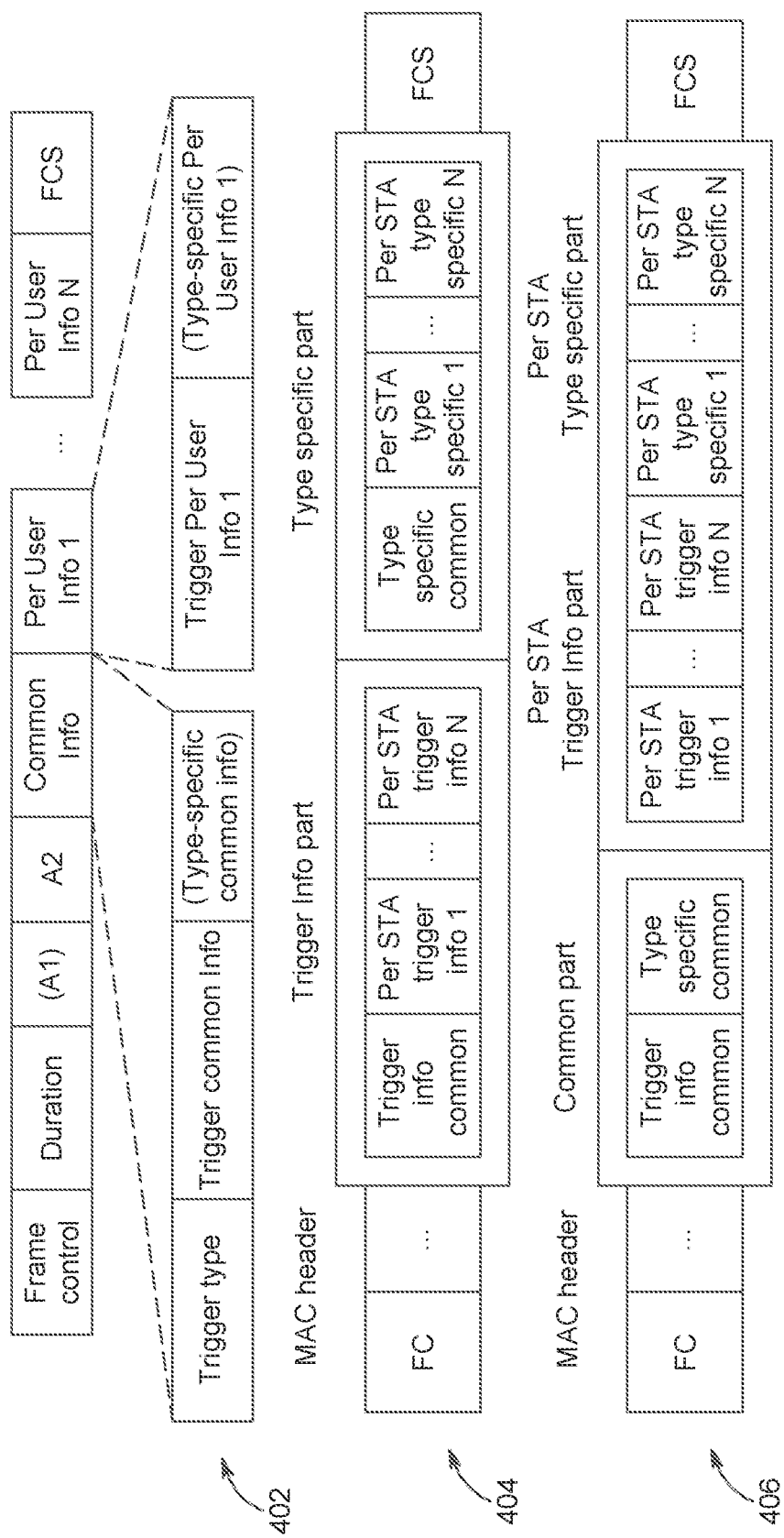
FIG. 4 is a diagram providing other examples of trigger frame formats.

FIG. 3 is a diagram 300 of an example trigger frame format for MU transmissions. In the example illustrated in FIG. 3, the trigger frame 300 includes a frame control (FC) field 302, a duration field 304, address fields 306, 308, a common information field 310, a number of per user information fields 312 corresponding to the number of STAs expected to transmit in the upcoming UL MU transmission, and a frame check sequence (FCS) 314. The common information included in the common information field 310 may include, for example, the format of the information, a duration and an indication of the purpose of the trigger. Per user information included in the per user information fields 312 may include, for example, an association ID (AID), a resource unit (RU) allocation description, and power control information. FIG. 4 is a diagram 400 providing other examples of trigger frame formats 402, 404 and 406, which may include optional additional or alternative information, such as type-specific common information and type-specific per user information in different locations in the frame.

While use of MU RTS/CTS and trigger frames may help with the hidden node problem for DL and UL MU transmissions, as described above, the NAV set based on the duration information included in the MU RTS/trigger frame may introduce new issues. Such issues (and others) may be addressed herein.

One new issue may concern interference from pre-existing OBSSs. For example, in a target wake time (TWT), an AP may use trigger frames to schedule transmissions of power save polls (PS-POLLs) from STAs and may then send DL frames accordingly. However, if a STA's clear channel assessment (CCA) status indicates OBSS NAV busy, the STA may not send a PS-POLL in response to a trigger frame. Further, the AP may not have any way of knowing whether the unresponsive STA has left the BSS or when it can trigger the PS-POLL again. Use of a common CTS before the trigger frame may not be effective to address this because the interference may have started before the CTS could be sent. However, if an AP knows about interference that STAs may be experiencing after the PS-POLL is sent, it may smartly schedule DL transmissions within the TWT on different time/frequency resources to avoid interference.

Figure 5:
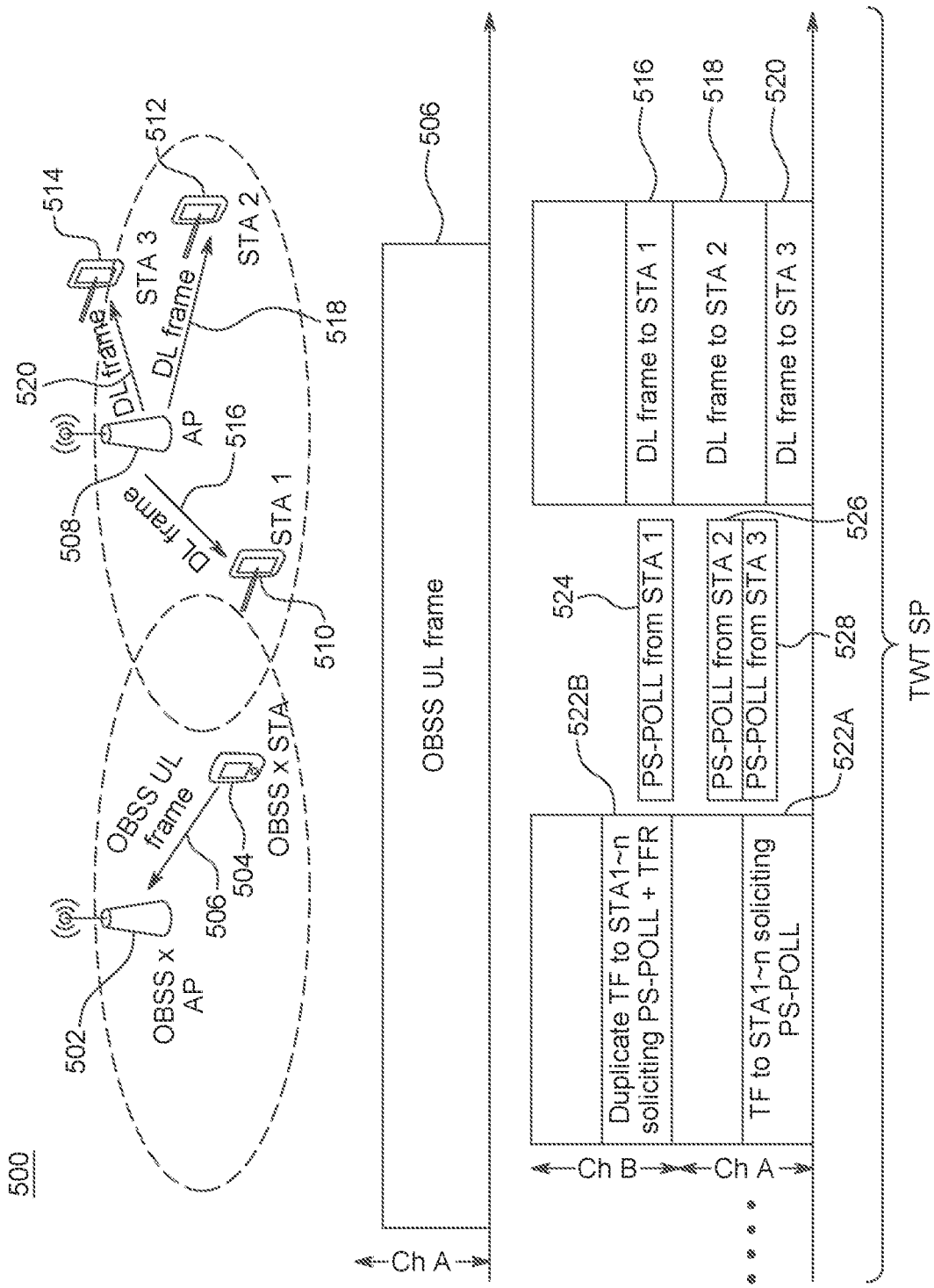
FIG. 5 is a diagram of an example of access point (AP) scheduling with overlapping basic service set (OBSS) interference avoidance.

FIG. 5 is a diagram 500 of an example of AP scheduling with OBSS interference avoidance. In the example illustrated in FIG. 5, a BSS includes an AP 508 and serving STAs 510, 512 and 514, and an OBSS includes an AP 502 and a STA 504. The STA 504 transmits an OBSS UL frame 506 on a channel A (e.g., a 20 MHz channel), which may interfere with transmissions to/from STA 510.

To avoid interference from the OBSS, in the example illustrated in FIG. 5, the AP 508 sends a trigger frame 522A to STAs 510, 512 and 514 and duplicates the trigger frame 522B in each 20 MHz channel (channel B in the illustrated example). In response to the trigger frame 522A, 522B, the STAs 510, 512 and 514 each select one of the 20 MHZ channels on which the trigger frame/duplicated trigger frame could be decoded and transmit a PS-POLL frame 524, 526, 528 on the selected channel. For STA 510, in the illustrated example, the trigger frame could not be decoded on channel A due to interference caused by the UL frame sent by OBSS STA 504. Accordingly, in the illustrated example, STA 510 sends the PS-POLL 524 on channel B while STAs 512 and 514 send PS-POLLs 526 and 528 on channel A.

On a condition that the trigger frame 522A, 522B assigns resources for the PS-Poll transmission corresponding to a channel on which a STA cannot decode the trigger frame, the STA may use random access (RA) resource units (RUs) in the selected 20 MHz channel to send the PS-POLL if random access on the selected 20 MHz channel is allowed. Otherwise, the STA may fail to reply to the trigger frame. In response to receiving the PS-POLLs 524, 526, 528 from the STAs 510, 512, 514, the AP may send DL data frames 516, 518, and 520 to the respective STAs 510, 512 and 514 using RUs in the channel in which the PS-POLL was received from the respective STA.

In embodiments, the STAs, such as STAs 510, 512, 514, may additionally or alternatively send interference information to an AP, such as the AP 508, using the PS-POLL frame, which may carry the interference information. For example, the PS-POLL frame may include free channel and/or busy channel indices. Free channel indices may be used to indicate the 20 MHz channels that are free, and busy channel indices may be used to indicate the 20 MHz channels that are occupied by IEEE 802.11 or other signals. For another example, the PS-POLL frame may include, in addition to, or instead of, the free and/or busy channel indices, information regarding interference level and/or interference duration. Interference level information may, for example, indicate a strength of the interference obtained, for example, as the result of a measurement, such a signal-to-noise ratio (SNR) or a received signal strength indicator (RSSI).

Figure 6:
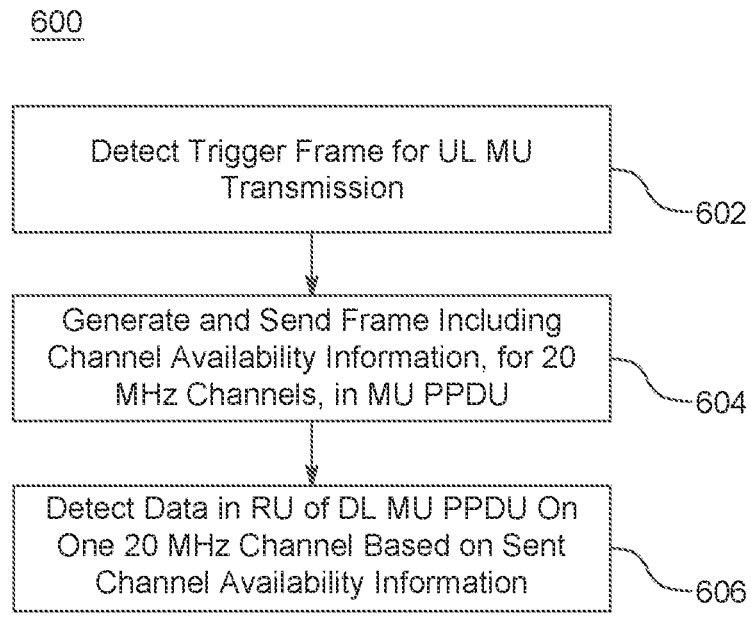
FIG. 6 is a flow diagram of another example of AP scheduling with OBSS interference avoidance.

FIG. 6 is a flow diagram 600 of another example of AP scheduling with OBSS interference avoidance. In the example illustrated in FIG. 6, a STA detects a trigger frame for a UL MU transmission (602). In response to the trigger frame, the STA may generate a frame and send it (604). In embodiments, the frame may be sent in an uplink (UL) MU PPDU or may be sent using simultaneous CTS in any other format. The STA may also transmit channel availability information for multiple channels in response to the trigger frame (604). In embodiments, the channel availability information may be included in the generated frame. In further embodiments, the trigger frame may be a request to send (RTS) frame, and the generated frame may be a split clear to send (CTS) frame. As described in more detail below, the split CTS frame may include a CTS frame followed by the channel availability information (e.g., the channel availability information may be sent an interframe space after the CTS frame or the channel availability information may appended at the end of the CTS frame). As further described below, the split CTS frame may include identifying information for the STA, such as a user specific sequence (USS), which may be transmitted with the channel availability information. Split CTS is described in detail below, and the split CTS described in this paragraph may incorporate any or all of the features of split CTS described elsewhere herein.

The multiple channels may be a combination of 20 MHz channels in a wider (e.g., 40 MHz, 80 MHz or 160 MHz) channel supported by an AP serving the STA. The STA may detect data in an RU of a DL MU PPDU on one of the multiple 20 MHz channels. The one of the multiple channels may be based on the transmitted channel availability information (606).

In another embodiment, an AP may use the proximity of STAs to one another to re-transmit to a STA when the original transmission, such as a frame in a DL MU transmission that is destined to the STA, is not received, for example, due to OBSS interference. This embodiment may make use of other STAs nearby a STA experiencing OBSS interference to relay the DL transmission where the nearby STAs are not experiencing the same interference as the STA.

Figure 7A:
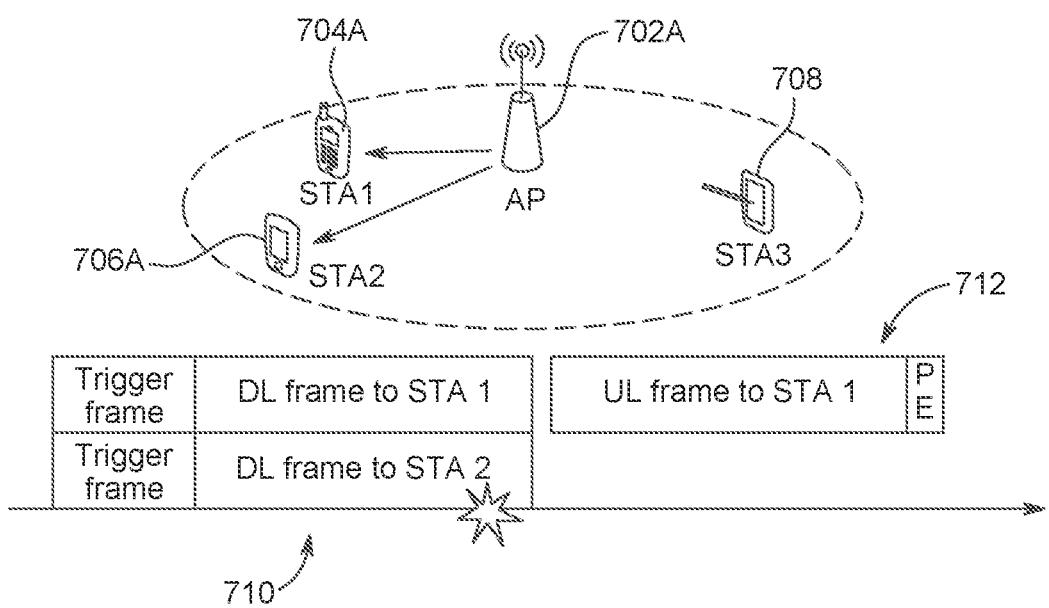
FIGS. 7A and 7B are diagrams of an example method of using a trigger frame to trigger a relayed re-transmission of a frame in a downlink (DL) MU transmission.
Figure 7B:
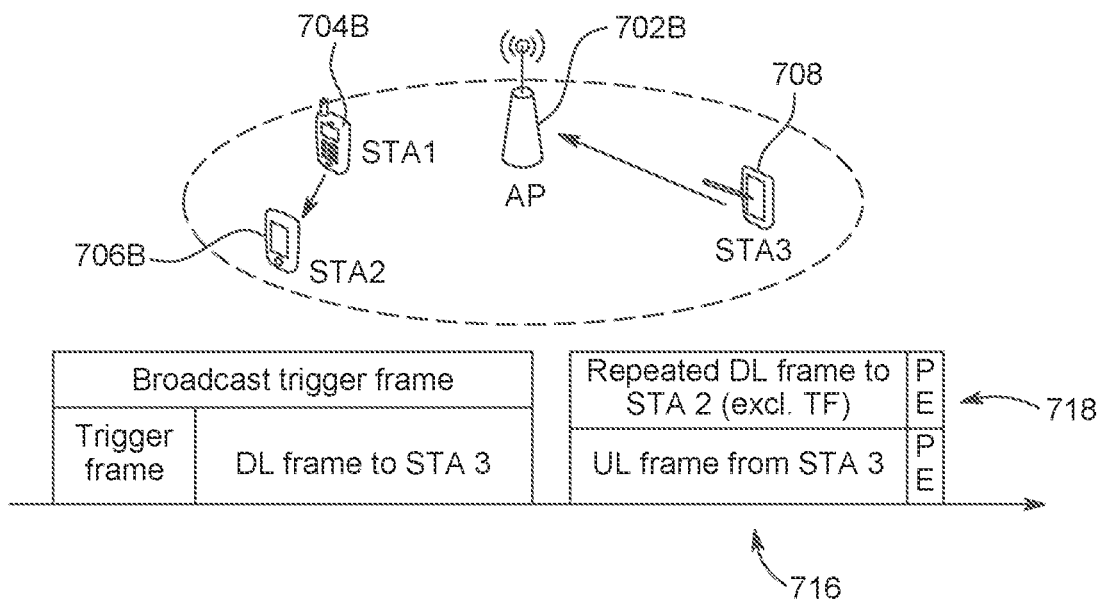

FIGS. 7A and 7B are diagrams 700A, 700B of an example method of using a trigger frame to trigger a relayed retransmission of a frame in a DL MU transmission. In the example illustrated in FIG. 7A, STA 706A is experiencing OBSS interference when AP 702A sends a DL MU transmission 710 (e.g. an aggregated MAC PPDU (AMPDU)) directed to STAs 704A and 706A. In the example illustrated in FIG. 7A, STA 704A is not experiencing the OBSS interference and is able to receive the transmission 710. Accordingly, STA 704A responds to the trigger with a UL frame 712 while STA 706A does not respond to the trigger frame.

In the example illustrated in FIG. 7B, using the proximity of STAs 704B and 706B, the AP 702B may send a DL MU transmission to trigger an MU transmission 716 that includes both a triggered UL transmission from STA 708 and a DL retransmission from the STA 704B to the STA 706B of the transmission 710. In an embodiment, the trigger frame may specify the scrambler initialization of the DL MU transmission 710 plus the STAID of STA 706B to identify the AMPDU to be re-transmitted. The MU transmission 716 may include a packet extension (PE) 718 to allow the receiver to have enough time to decode the packet before responding.

All UL MU-PPDUs may be padded to the same length. Accordingly, a STA may use the pre-forward error correction (FEC) padding in a UL-AMPDU to feedback the overheard DL-AMPDUs preceding the UL transmission 712. A STA may also feedback information indicating that STA 706B is nearby based on previous knowledge of overhead UL transmissions. With this information, the AP 702 may immediately schedule a trigger frame for DL retransmission following the UL transmission 712. Since the PPDUs have a PE, the PE or post-FEC padding may be used to feedback the overhead DL-AMPDUs preceding the UL transmission 712. Although the AP 702 may not have time to decode the information carried in the PE or post-FEC padding, the AP 702 may use this information to schedule the DL retransmission in a later trigger frame. In embodiments, a PPDU following the trigger frame may be entirely DL, such as where both the AP 702 and STA 704 retransmit a DL AMPDU in the same or different RU to increase diversity.

Another new issue may concern backward compatibility. In particular, in order to support backward compatibility, use of both high throughput (HT) and non-HT CTS frames may be supported. However, for MU RTS/CTS, use of both HT and non-HT CTS frames may result in wastage of resource allocations. For example, multiple STAs may transmit non-HT CTS frames in the same time slot on a 20 MHz channel base, and the receiving AP may not be able to distinguish the STAs that transmitted the CTS frames. As a result, the AP may blindly transmit DL MU frames to STAs, which may be unable to receive them.

Figure 8:
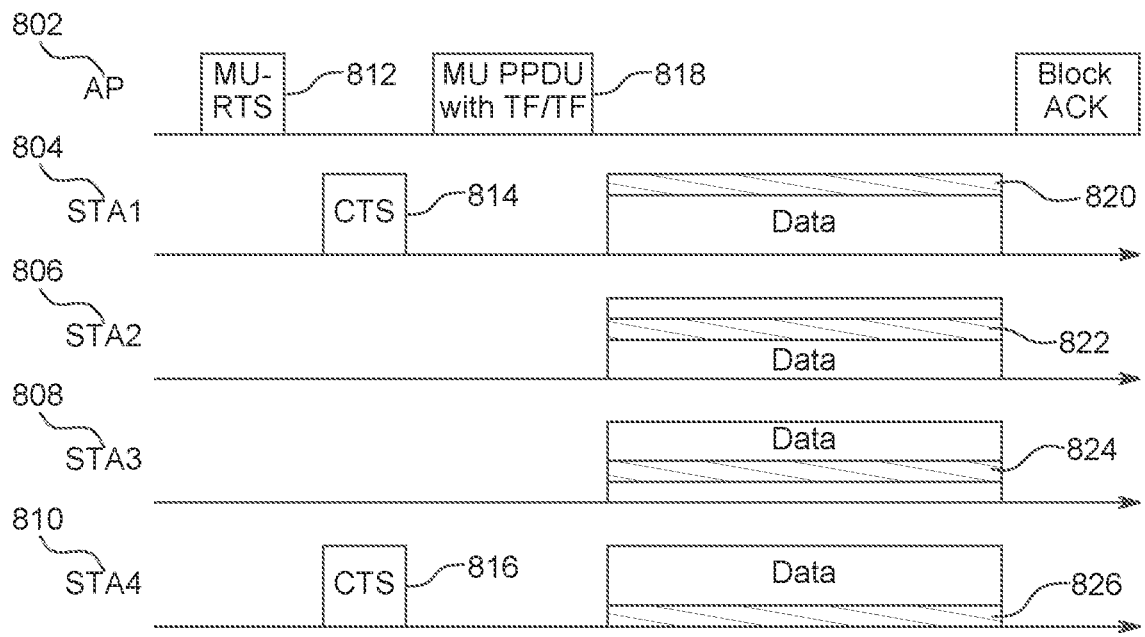
FIG. 8 is a signal diagram of an example multi-user request to send/clear to send (MU-RTS/CTS) where both high throughput (HT) and non-HT CTS frames are supported for backward compatibility.

FIG. 8 is a signal diagram 800 of an example MU-RTS/CTS where both HT and non-HT CTS frames are supported for backward compatibility. In the example illustrated in FIG. 8, an AP 802 transmits an MU-RTS 812 to STAs 804, 806, 808 and 810, but only STAs 804 and 810 are able to receive it. Thus, STAs 804 and 810 simultaneously transmit CTS frames 814, 816 to the AP 802. STAs 806 and 808 do not reply to the MU-RTS 812. The AP 802 may detect reception of the CTS 814, 816 but may not know the identities of the STAs that the transmitted them. Accordingly, the AP 802 may assign resources to all of the STAs 804, 806, 808, and 810 using a DL MU PPDU 818 (as illustrated in FIG. 8) or a standalone transmission (not shown). Since only STAs 804 and 810 can transmit data using the assigned resources (820 and 826 in FIG. 8), the resources assigned to STAs 806 and 808 (822 and 824 in FIG. 8) are wasted. In another scenario not illustrated in FIG. 8, the AP 802 may begin a DL MU transmission to STAs 804, 806, 808 and 810 directly after reception of the CTSs, and the transmissions to STAs 806 and 808 would be wasted.

Another new issue may concern NAV extension for STAs that cannot understand HE frames. For example, where both HE and non-HE CTS is supported, MU-RTS/CTS exchanges may set NAV at the beginning of the MU TXOP. However, if the AP and/or STAs decide to extend NAV at some point, the legacy STAs may not be able to successfully update the NAV setting because they cannot understand the HE frame. Another new issue may concern the combined energy of the combined CTS potentially overwhelming the automatic gain control (AGC) of the AP's receiver.

Yet another new issue may concern protection for directional transmissions. For example, wireless networks, such as IEEE 802.11 networks, may support directional transmission of both MU and single-user (SU) PPDUs, including usage of the legacy preamble part for the SU PPDU. This may, however, introduce extra hidden nodes due to the different coverage range for directional and omni-directional transmissions.

In embodiments, simultaneous non-HT CTS may be used, where an AP may poll an integer number M STAs in an MU-RTS frame, and the AP may operate on a channel with an integer number N 20 MHz sub-channels. The AP may request or suggest that the M STAs respond with non-HT CTS frames on one or more of the 20 MHz subchannels using one of a number of different methods, such as described below. The various methods described herein may be implemented alone or in combination.

In one example method, an AP may request that all of the STAs that successfully receive the MU-RTS frame and are capable of responding transmit a non-HT CTS frame. The AP may indicate in the MU-RTS frame that a full response is requested. The AP may operate on a channel bandwidth wider than 20 MHz while the non-HT CTS frame may be transmitted over a 20 MHz channel. The AP may schedule the non-HT CTS frame transmission using one or more of symmetrical MU-RTS/CTS, asymmetrical MU-RTS/CTS and STA driven MU-RTS/CTS.

Using symmetrical MU-RTS/CTS, the AP may request the STAs to respond with a CTS frame on a 20 MHz channel basis and to duplicate the frame in all of the 20 MHz sub-channels with or without phase rotation. The CTS protection may, thus, be over the entire channel and may be symmetrical to the MU-RTS. Using this method, a STA addressed by the MU-RTS frame may transmit CTS frames after an inter-frame space (e.g., short inter-frame space (SIFS) period) if the NAV at the STA receiving the MU-RTS frame indicates that the medium is idle in all of the sub-channels. The STA may need to perform primary channel CCA, secondary channel CCA and/or CCA on all of the 20 MHz sub-channels.

Using asymmetrical MU-RTS/CTS, the AP may request the STAs to respond with a CTS frame in one or more assigned 20 MHz sub-channels. The one or more assigned sub-channels may or may not include the primary 20 MHz sub-channel. On a condition that more than one 20 MHz channel is assigned to one STA, the STA may duplicate the CTS frame on a 20 MHz channel basis. Using this method, a STA addressed by the MU-RTS frame may transmit CTS frames after an inter-frame space (e.g., SIFS period) if the NAV at the STA receiving the MU-RTS frame indicates that the medium is idle in the assigned sub-channels. The STAs may need to perform primary channel CCA and/or secondary channel CCA. The AP may include sub-channel scheduling information in the MU-RTS frame.

In one example method of asymmetrical MU-RTS/CTS, the AP may try to evenly distribute the users to sub-channels. For example, the AP may operate on N 20 MHz sub-channels, and the MU-RTS may be sent to M STAs. The AP may schedule round(M/N) users for the first N−1 20 MHz sub-channels, while the last 20 MHz sub-channel may be used for M−round(M/N)*(N−1) users. Other functions, such as ceiling, floor, or mod may also be used.

In another example method of asymmetrical MU-RTS/CTS, the AP may use the same resource allocation for CTS scheduling and the data transmission after the MU-RTS/CTS exchange. In this example, a STA may need to transmit a CTS frame on one or more 20 MHz sub-channels.

Using STA driven MU-RTS/CTS, the AP may allow the STAs to choose one or more sub-channels and reply with the CTS frame on the one or more chosen sub-channels. Using this method, a STA addressed by the MU-RTS frame may transmit CTS frames on one or more certain sub-channels after an inter-frame space (e.g., SIFS period) if the NAV at the STA receiving the MU-RTS frame indicates that the medium is idle in the chosen sub-channel or sub-channels. The STA may need to perform primary channel CCA, secondary channel CCA and/or CCA on all of the 20 MHz sub-channels.

In another example method, an AP may request that some of the intended STAs that successfully received the MU-RTS frame and are capable of responding transmit a non-HT CTS frame. The AP may indicate in the MU-RTS frame that a Partial Response is requested and may identify STAs that are requested to respond with a non-HT CTS frame. The AP may operate on a channel bandwidth wider than 20 MHz, while the non-HT CTS frame may be transmitted over a 20 MHz channel. The AP may schedule the non-HT CTS frame transmission using one or more of the CTS scheduling methods described herein.

As described briefly above, the MU RTS frame may be a variation of a trigger frame, which may carry, for example, a number of fields, such as a Trigger Type field, a Type Specific Information field, and a Per User Type Specific Information field. The Trigger Type field may be used to indicate that the trigger frame is an MU-RTS frame. Non-AP STAs may respond to the trigger frame depending on their NAV settings and/or the Trigger Type of the trigger frame. A STA that is polled by a trigger frame with Trigger Type MU-RTS may not respond if the STA has a NAV set from one or more non-AP STAs in the same BSS in one or more sub-channels or from one or more non-AP and/or AP STAs in OBSSs in one or more sub-channels.

On a condition that the STA has a NAV previously set by the AP that transmitted the MU-RTS frame, the STA may ignore or update the previously set NAV and respond. This may occur, for example, where the AP's MAC address is set in the TA field and the STA's MAC address is set in the receiver address (RA) field of the MU-RTS/trigger frame or where the AP's MAC address is in the transmitter address (TA) field and the STA ID is included in the Common Information and/or Per User Information field. This scenario may occur, for example, in a cascading MU TXOP where an AP may communicate with a set of STAs at one time slot. In the next time slot, the AP may decide to communicate with another set of STAs and use an MU-RTS frame to poll the new set of STAs.

The Type Specific Information field and/or the Per User Type Specific Information field of the MU-RTS may carry the sub-channel assignment, resource allocation, or scheduling information. In embodiments, the 20 MHz sub-channels acquired by an AP may be ordered by certain criteria. For example, the sub-channels may be ordered using the channel starting frequency. Thus, when bitmap or sub-channel index methods are used, both the AP and STAs may identify the sub-channel. In embodiments, for each STA, a sub-channel bitmap may be employed such that, for each STA, N bits may be used to indicate N sub-channels. In such embodiments, if the kth bit is set, the STA may transmit a CTS frame on the kth 20 MHz sub-channel. In other embodiments, a user bitmap method may be employed such that, for each sub-channel, M bits may be used to indicate the M users. In such embodiments, if the kth bit is set, for example, the STA k may transmit a CTS frame on the 20 MHz sub-channel (the STAs may be ordered using predefined criteria). The STA ID, which may be included in the Per User Information field, may not be included in the bitmap. In yet other embodiments, a sub-channel index method may be employed where, for each STA, a set of 20 MHz sub-channels may be assigned. In such embodiments, sub-channel indices, which may be ceil(log 2(N)) bits long, may be used to indicate the allocated sub-channels. In yet other embodiments, a user index method may be employed where, for each sub-channel, a set of STAs may be assigned. In such embodiments, STA indices, which may be ceil(log 2(M)) bits long, may be used to indicate the allocated STAs (the STAs may be ordered using predefined criteria). The STA ID, which may be included in the Per User Information field, may not be included in the user index.

Directional transmissions starting from the legacy part may be signaled in the MU-RTS trigger frame. For example, one or more bits in the Common Information and/or User Specific Information field may be used to indicate that the transmission following the MU-RTS/CTS frame exchanges may be a directional transmission. In particular, the directional transmission may be performed over the entire PPDU including the Legacy preamble, HE preamble, and data part. The directional transmission duration may be signaled in the MU-RTS trigger frame. The directional transmission duration may bi-directionally cover the time period used for directional transmission.

In embodiments, a directional single user transmission may also be protected using MU-RTS/CTS exchanges. A directional single user transmission may also be protected using other types of protection mechanisms in which the directional transmission and the directional transmission duration fields may present.

In embodiments, a trigger frame with Trigger Frame type MU-RTS may be transmitted using an SU PPDU format either over the entire band or in each 20 MHz channel (and repeated over the rest of the 20 MHz channels). A trigger frame with Trigger Type MU-RTS may also be transmitted using an MU PPDU format using one or more RUs or using one or more RUs in each 20 MHz channel (repeated with or without phase rotation in the rest of the 20 MHz channels). Such embodiments may be applied to other trigger frames with different trigger types.

To support backward compatibility to legacy STAs, CTS frames may be transmitted using a non-HT PPDU format. A non-HT PPDU contains a legacy short training field (L-STF), a legacy long training field (L-LTF), a legacy OFDM signal (L-SIG) field and data fields. A CTS frame transmitted using a non-HT PPDU may use the same modulation and coding scheme (MCS) and scrambling seeds, and, thus, the frame transmitted from multiple STAs may be the same. However, an AP receiving the non-HT CTS frame may not know the identities of the STAs transmitting the non-HT CTS frames and, thus, may inefficiently send downlink transmissions to all STAs addressed in the MU RTS, regardless of whether the STA sent a CTS or not.

In embodiments, a CTS frame may be transmitted as a split CTS. A split CTS frame may include a traditional CTS frame and a user specific sequence (USS). The traditional CTS frame may be carried using a non-HT PPDU and may be detectable by legacy STAs. The USS may be carried using an HT or other PPDU and may be detected by HE or other STAs. The AP may assign the USS using the MU-RTS frame, Beacon frame, Association frame, or Re-Association frame.

Figure 9:
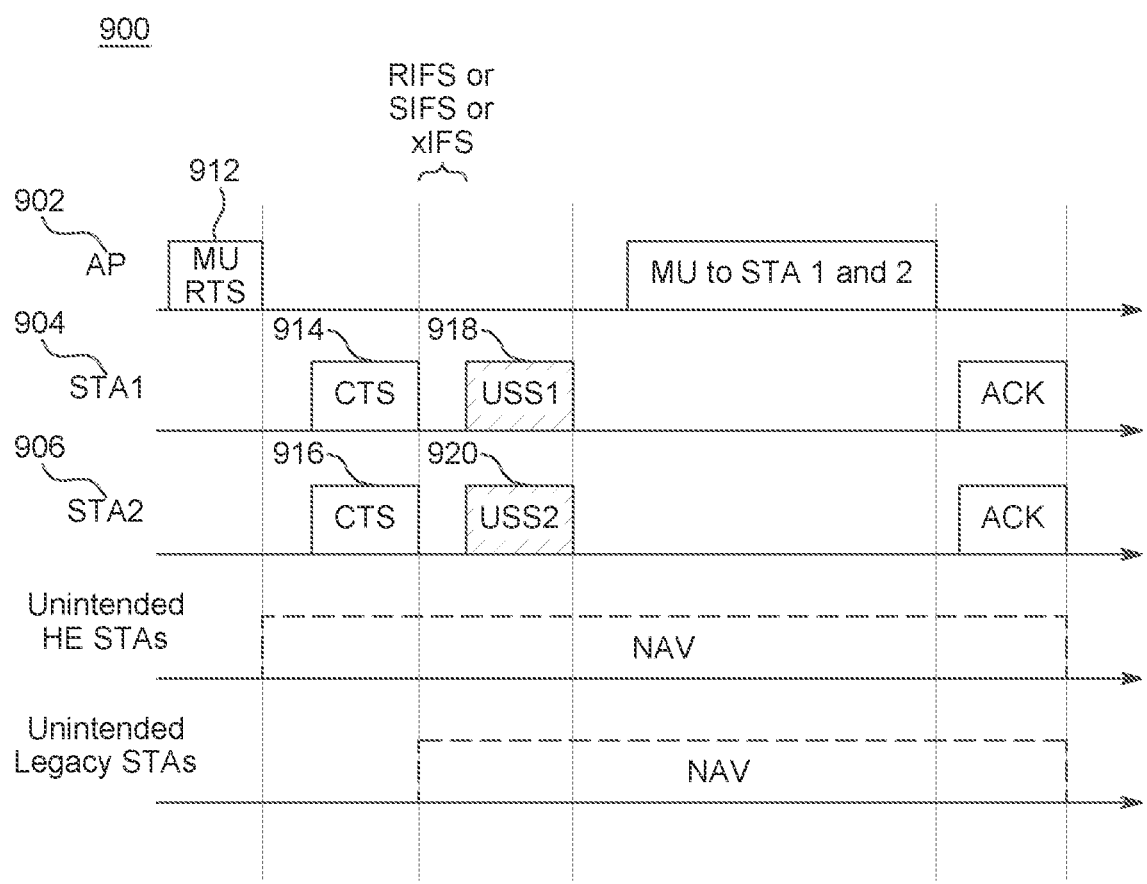
FIG. 9 is a diagram of an example of protecting an MU transmission opportunity (TXOP) with an MU-RTS and a split CTS.

FIG. 9 is a diagram 900 of an example of protecting an MU TXOP with an MU-RTS and a split CTS. In the example illustrated in FIG. 9, an AP 902 transmits an MU-RTS frame 912, which may indicate that a split CTS transmission is expected. The duration field of the MU-RTS frame may be set to cover the entire TXOP. If the MU-RTS frame 912 is transmitted in the middle of an MU-TXOP, the duration field may be used to redefine the MU TXOP duration.

STAs addressed by the MU-RTS frame 912 (STAs 904 and 906 in FIG. 9) may transmit split CTS frames an inter-frame space (e.g., SIFS period) after the MU RTS frame if the NAV at the STAs receiving the MU-RTS frame 912 indicates that the medium is idle. The STAs 904 and 906 may transmit a conventional CTS frame 914, 916 using a non-HT PPDU. The duration field may be set using the duration set by the MU-RTS frame and may be adjusted by subtracting the inter-frame space (e.g. SIFS time) and the number of microseconds required to transmit the CTS frame at a data rate determined by the MU-RTS frame. The Length field indicated in the L-SIG of the CTS frame may indicate the length of the CTS frame (not including the USS). The STAs 904, 906 may continue transmitting a USS 918, 920 an inter-frame space (e.g., SIFS, reduced inter-frame space (RIFS) or xIFS) period after the end of the CTS frame. Alternatively, the STA may append the USS at the end of the CTS frame without the inter-frame space.

In embodiments, a USS may include an LTF sequence scrambled by a P matrix. For example, if the MU-RTS frame addresses eight or less users, the 8×8 P matrix may be used. In this example, the AP may assign each STA a user index in the range of [1,8]. The user index assignment may be indicated in the MU-RTS frame or other frames transmitted by the AP, such as the Beacon frame, Trigger frame, or Association frame. The STA with user index k may use the kth row or column of the P matrix to scramble the LTF sequence. Other orthogonal matrices, such as FFT matrices, may be used to generate the USS in the same way.

In embodiments, a USS frame may be used to carry the USS. The USS frame may be a specially designed PPDU, which may include the USS only in the frequency domain or time domain. Alternatively, the USS frame may carry an STF and a USS. The STF may be used, for example, for AGC and/or timing/frequency synchronization. The USS frame may be transmitted using the same sub-channels that were used for a previous CTS transmission, or the USS frame may be allowed to be transmitted on sub-channels other than the ones used for the CTS transmission.

In the embodiments described above, the terminology non-HT CTS is used to refer to a CTS frame transmitted using a non-HT PPDU. However, embodiments may not be so limited and may be applicable to any type of CTS frame. Split CTS capability, which may be used to indicate that the device is able to perform split CTS transmission, may be sent in the MU capability field, other capability field and/or information element that may be transmitted in a Beacon frame, Association or Re-association Request/Response frame, Prob Request/Response frame and/or other type of frame by the AP and STAs.

Figure 10:
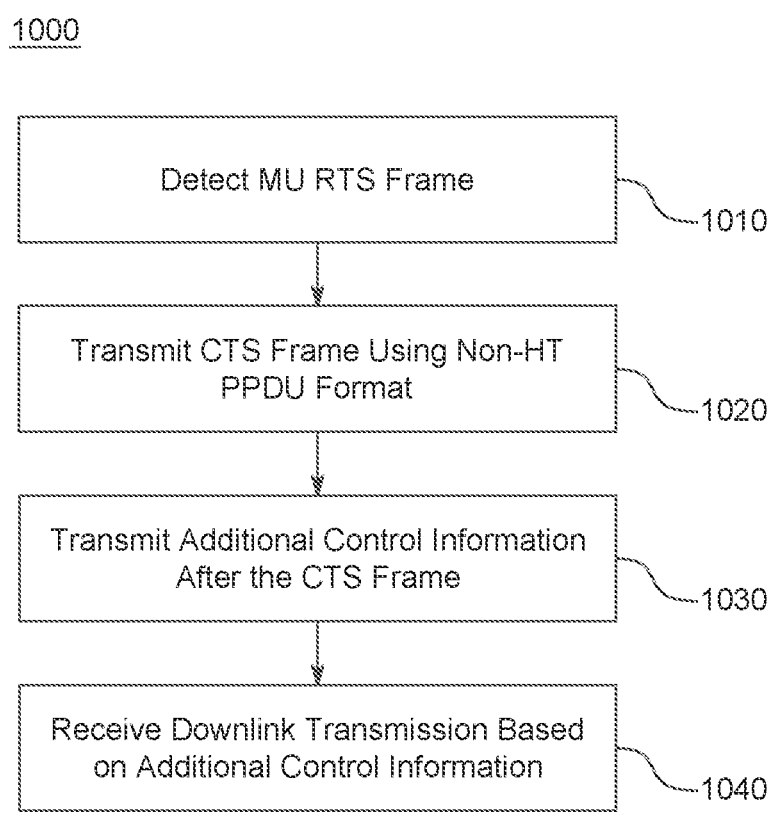
FIG. 10 is a flow diagram of an example method of split CTS.

FIG. 10 is a flow diagram 1000 of an example method of split CTS. In the example illustrated in FIG. 10, a WTRU may detect an MU RTS frame (1010) and, in response to the MU RTS frame, transmit a CTS frame using a non-HT PPDU format (1020). In response to the MU RTS frame, the WTRU may transmit additional control information after the CTS frame (1030). The WTRU may receive a DL transmission, in response to the CTS frame, based on the additional control information transmitted after the CTS frame (1040).

Figure 11:
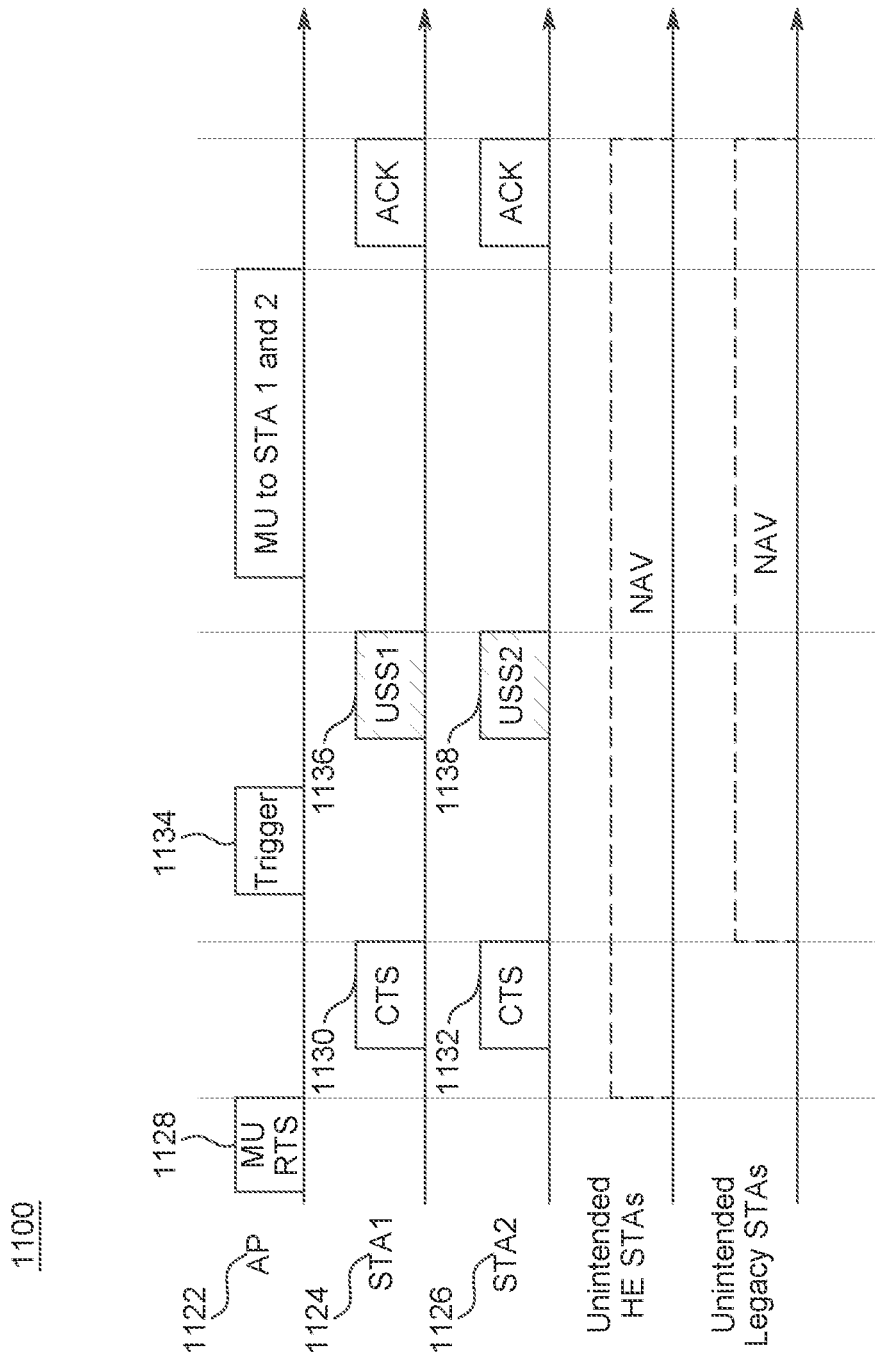
FIG. 11 is a diagram of another example of split CTS where the AP polls the user specific sequence (USS) with a trigger frame.

FIG. 11 is a diagram 1100 of another example of split CTS where the AP polls the USS with a trigger frame. In the example illustrated in FIG. 11, an AP 1122 transmits an MU-RTS frame 1128, which may indicate that a split CTS transmission is expected in response to the MU-RTS frame 1128. The duration field of the MU-RTS frame 1128 may be set to cover the entire TXOP. On a condition that an MU-RTS frame, such as MU-RTS frame 1128, is transmitted in the middle of a TXOP, the duration field may be used to re-define the MU TXOP duration.

STAs addressed in the MU-RTS frame 1128, such as STAs 1124 and 1126 in FIG. 11, may transmit split CTS frames an interframe space (e.g., SIFS duration) after the end of the MU-RTS frame 1128, for example, if the NAV at the STAs receiving the MU-RTS frame indicate that the medium is idle. As illustrated in FIG. 11, for example, the STAs 1124 and 1126 may transmit conventional CTS frames 1130, 1132 using a non-HT PPDU. The duration of the conventional CTS frame may be set using the duration set by the MU-RTS frame adjusted by subtracting a SIFSTime and the number of microseconds required to transmit the CTS frame at a data rate that may be determined by the MU-RTS frame. The length sub-field indicated in the L-SIG field of the CTS frame 1130, 1132 may indicate the length of the CTS frame (e.g., the length of the conventional CTS frame 1130, 1132). In the example illustrated in FIG. 11, the AP 1122 has enhanced capability and transmits a new trigger frame 1134 (or a trigger variant) to solicit a USS from one or more enhanced non-AP STAs (STAs 1124 and 1126 in FIG. 11).

An interframe space (e.g., xIFS duration) after receiving the trigger frame 1134, STAs that are capable of responding (STAs 1124 and 1126 in FIG. 11) may transmit a user specific packet or USS 1136, 1138. The USS or user specific packet may include a USS or one or more portions of the user specific packet, such as the PLOP header, that is modulated by a specific user sequence, such as a P-matrix sequence. The xIFS duration may be a SIFS, RIFS, xIFS or other InterFrame Spacing period.

In embodiments, the AP may acquire a channel with wide bandwidth (which may be composed of multiple sub-channels). However, the non-AP STAs may be able to transmit on a narrower channel or one or more sub-channels based on the STA's capability, carrier sensing and/or virtual carrier sensing results. Information regarding the availability of the STA on one or more sub-channels may be exchanged using the second Trigger frame and the following USS frame. To achieve this, the AP may need to distinguish packets transmitted by each STA.

The availability of a STA on one or more sub-channels may be implicitly signaled by transmitting an extended service seta user specific sequence (USS) frame on one or more sub-channels with a given sequence. Alternatively, the USS frame may be transmitted over one or more RUs on one or more sub-channels with a given sequence. For example, an AP may intend to communicate with a STA on channel 2. The AP may allocate RU x on channel 2 to the STA. In order to allow more STAs to implicitly signal the channel availability concurrently, the AP may also allocate a sequence to the STA to transmit in RU x on channel 2. The STA may puncture the sequence in the un-allocated RUs, for example, by transmitting 0 instead of a modulated symbol based on the sequence. On a condition that the AP supports multi-stream transmitting/receiving, the sequence may be repeated and scrambled by the P matrix. The AP may indicate the stream index by indicating which row or column of a P matrix is used to scramble the sequence.

Figure 12:
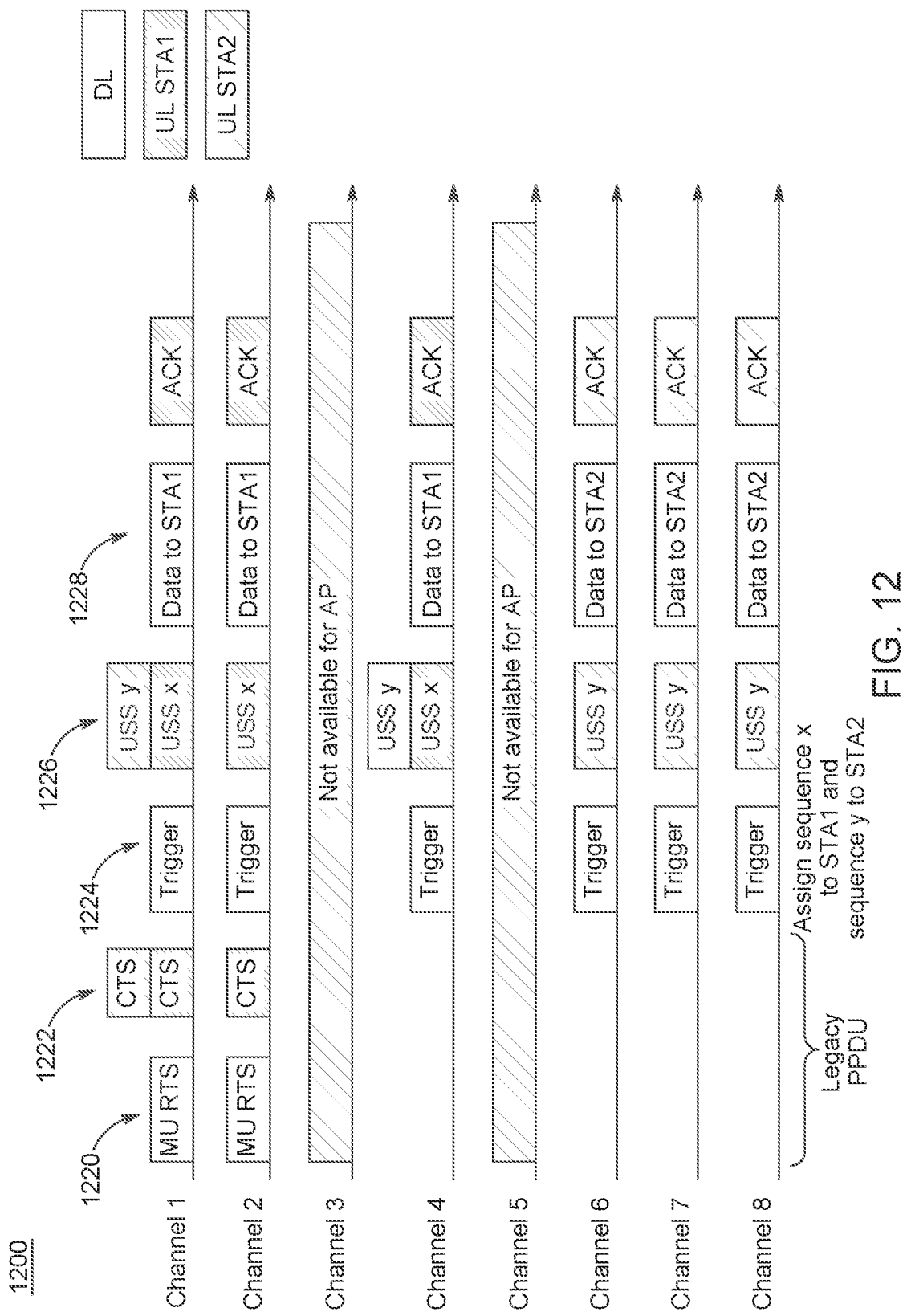
FIG. 12 is a diagram of an example of code division multiple access (CDMA) for USS frames.

FIG. 12 is a diagram 1200 of an example of code division multiple access (CDMA) for USS frames. In the example illustrated in FIG. 12, an AP may observe that channels 3 and 5 are busy while channels 1, 2, 4, 6, 7 and 8 are available. The AP may also intend to communicate with two STAs, STAs 1 and 2. In the illustrated example, STA 1 is available on channels 1, 2, 3, 4 and 5, and STA 2 is available on channels 1, 4, 5, 6, 7 and 8.

In the example illustrated in FIG. 12, the AP transmits a first trigger frame with variation MU-RTS to STAs 1 and 2 (1220). Channel 1 may be the primary channel. In embodiments, the AP may use a legacy (e.g., non-HT) PPDU to carry the MU-RTS frame and may transmit it over channels 1 and 2. In other embodiments, the MU-RTS frame may be carried by an enhanced (e.g., HT) PPDU, and, thus, it may be transmitted over all of the available channels (e.g., channels 1, 2, 4, 6, 7 and 8 in the example illustrated in FIG. 12).

STAs 1 and 2 may reply to the MU-RTS 1220 with CTS frames (1222) using, for example, a legacy PPDU on channels 1 and 2 based on their availability. On a condition that STA 2 is not available on channel 2, it may transmit its CTS frame only on channel 1.

On reception of the simultaneous CTS (1222), the AP may not know the sub-channel availability of the STAs 1 and 2 and may, thus, transmit a second trigger frame (1224) in, for example, an enhanced PPDU over channels 1, 2, 4, 6, 7 and 8 for channel bandwidth information exchange. User specific sequences may be sent in the second trigger frame to the STAs that are being triggered to reply with a USS frame (1226). In embodiments, the second trigger frame may be used independently of the first trigger frame/CTS frame exchange (1220/1222).

In embodiments, the Common Information field of the trigger frame may indicate the variant of the trigger and USS frame format expected in reply to the second trigger frame. The User Information field of the trigger frame may indicate the sequence index/ID assigned to the STA. On a condition that the AP is operating on multiple channels, the AP may indicate the channel or channels it intends to check for STA availability. Alternatively, the AP may not indicate any channels, and the STAs may be prepared to transmit on all the available channels.

A set of sequences with a good correlation property or that are orthogonal may be explicitly defined in the system and known by the STAs. The sequences in the set may be ordered by sequence index/ID, which may be specified and known by the STAs. For example, the good correlation property may be a zero cross correlation property, and the sequences may be Golay sequences or Zadoff-Chu sequences. On a condition that multiple channel bandwidths are supported, a sequence set for the smallest basic channel bandwidth may be specified and sequence indices/IDs may be defined. For example, for IEEE 802.11ax, the smallest basic channel bandwidth may be 20 MHz. To transmit on a wider bandwidth, the sequence may be repeated with or without phase rotation in the time or frequency domain.

In other embodiments, one or more known sequences, such as a long training field (LTF), may be specified. It may be assumed that the AP is able to transmit/receive with up to N data streams and each frequency channel may have M non-overlapping Resource Units (RUs). The AP may assign the $n^{th}$ stream and the $m^{th}$ RU to a STA for RSS transmission. Thus, in the User Information field, the triplet <AID, RU index/range, spatial stream index/range> may be used to assign the STA associated with the AID to transmit on one or more RUs using certain spatial streams. In the Common Information field, the expected variant of the Trigger and USS frame format may be indicated. For example, the Trigger type may indicate that the expected response frame should contain a preamble only and no MAC frame should be included (e.g., a Null Data Packet (NDP) type response). Alternatively, the information may also be indicated in the User Information field.

In one example, the expected USS frame may be a frame with a preamble only with no MAC frame included. The sequence may be the enhanced LTF sequence where the un-allocated RUs may be punctured (e.g., 0 may be transmitted instead of a modulated symbol). In this example, the AP may want to check the availability of STA1 and STA2 on channels 1, 2, 4, 6, 7, and 8. In one example, the AP may want to distinguish them in the frequency domain only, and it may assign RUs 1-4 on channel x to STA1 and RUs 5-8 on channel x to STA2. Channel x may include channels 1, 2, 4, 6, 7, and 8. The spatial index may be 1 or default for both STA1 and STA2. Alternatively, the AP may want to distinguish them in the spatial domain only, and it may assign all the RUs on channel x to STA1 with spatial index 1 and all the RUs on channel x to STA2 with spatial index 2. Channel x may include channels 1, 2, 4, 6, 7, and 8.

On a condition that the AP expects responses from a large set of STAs, the AP may distinguish them in both the frequency and spatial domains. If there are STAs that cannot be uniquely allocated using both frequency and spatial resources, the AP may transmit more trigger frames after the trigger/USS frame exchange (1224/1226). In this example, the Cascade Indication in the trigger frame may be set to indicate that more trigger frames are expected.

In still further embodiments, the sequences may be specified and known by the STAs. Each STA may use its ID to scramble the sequence. The ID may be assigned by the AP and/or signaled in the trigger frame. The ID may be the AID, the AP's BSSID, another type of ID, or a combination of multiple IDs.

The non-AP STAs that are not addressed by the trigger frame may sense the channels. If the channel is free, they may transmit USS frames based on the available channels using the instruction in the second trigger frame.

In the embodiments described above where the Common Information field of the trigger frames indicates the variant of the trigger and USS formats expected and the User Information field of the trigger frame indicates the sequence index/ID assigned to the STA, the STA may transmit the assigned sequence on all of the available channels. On the condition that the AP indicates certain channels for the STA, the STA may transmit the assigned sequence on all of the available channels that were indicated by the AP. In the embodiments described above where one or more known sequences are specified, the STA may transmit the assigned sequence on assigned RUs using the assigned spatial index if the corresponding channel is free for this STA. In the embodiments where the sequences are specified and known by the STAs, the STA may use its own ID to scramble the sequence and may transmit it on all of the available channels. On the condition that the AP indicates certain channels for the STA, the STA may transmit the scrambled sequence on all of the available channels that the AP indicated. On reception of the USS frame (1226), the AP may know the channel availability of the STA based on the AP having received a signal on that channel. In other words, the AP may check the reception of the USS frame on each channel. If the AP receives valid signals on assigned RU(s) and spatial stream(s), it may consider the corresponding STA to be available for the channel.

In a more specific example, it may be assumed that the AP may transmit on two channels, channel 1 and channel 2. In this example, channel 1 is the primary channel. The AP may check the availability of ten STAs, STAs 1-10. The first trigger frame (e.g., MU-RTS) and simultaneous CTS exchange may or may not be performed. It may be assumed that each channel has nine RUs and the AP is able to transmit/receive at least two MU-MIMO data streams.

The AP may transmit a trigger frame requesting a channel availability report from the STAs 1-10. The AP may use different combinations to assign RUs and spatial streams to the STAs. For example, the AP may assign: STA 1 to respond on RU1-2 on both channels 1 and 2 using spatial stream 1; STA2 to respond on RU1-2 on both channels 1 and 2 using spatial stream 2; STA 3 to respond on RU3-4 on both channels 1 and 2 using spatial stream 1; STA4 to respond on RU3-4 on both channels 1 and 2 using spatial stream 2; STA5 to respond on RU5-6 on both channels 1 and 2 using spatial stream 1; STA6 to respond on RU5-6 on both channels 1 and 2 using spatial stream 2; STA7 to respond on RU7-8 on both channels 1 and 2 using spatial stream 1; STA8 to respond on RU7-8 on both channels 1 and 2 using spatial stream 2; STA9 to respond on RU9 on both channels 1 and 2 using spatial stream 1; and STA10 to respond on RU10 on both channels 1 and 2 using spatial stream 2.

FIG. 13 is a diagram 1300 of an example Common Information field of a trigger frame. The example Common Information field illustrated in FIG. 3 includes a number of sub-fields, including a Trigger Type sub-field 1302, a Length sub-field 1304, a Number of HE-LTF Symbols sub-field 1306, an STBC sub-field 1310, an LDCP Extra Symbol sub-field 1312, a Packet Extension sub-field 1314, a Spatial Reuse sub-field 1308 and a Doppler sub-field 1316. In the Trigger Type sub-field 1302, one value may be used to indicate that the trigger frame is an NDP trigger or that the trigger is for bandwidth reporting, channel availability reporting or both. The Length sub-field 1304 may indicate the value of the L-SIG Length field of the expected UL response frame. This sub-field may also implicitly indicate a request for an NDP response if it is set to cover the enhanced LTF fields but not the MAC data field. The Number of HE-LTF Symbols sub-field 1306 may indicate the enhanced LTF symbols in the expected UL response frame. In the example illustrated in FIG. 13, the sub-field 1306 is set to 2 and, thus, two spatial streams may be expected. The Spatial Reuse sub-field 1308 may, for example, not be permitted for NDP response.

Other sub-fields, such as the STBC sub-field 1310, the LDCP Extra Symbol sub-field 1312, the Packet Extension sub-field 1314, and the Doppler sub-field 1316 may be re-interpreted if the Trigger Type sub-field 1302 or the Length sub-field 1304 indicate that this is an NDP type trigger and/or a trigger for a bandwidth request and may, thus, be used for other purposes. For example, the bits may be used to indicate that the AP may signal the RU/spatial index allocation for one channel with basic/minimum bandwidth (e.g., 20 MHz for IEEE 802.11ax) and may allow the STAs to use the RU/spatial index allocation for all of the available channels with the basic/minimum bandwidth. In an example, the AP may check the channel availability of STA1 and STA2 on all of the channels (e.g., channel 1 and 2). Once the bits are set, the AP may need to signal the RU/spatial index allocation for one basic channel, and the STAs may use it for both channel 1 and channel 2.

FIG. 14 is a diagram 1400 of an example User Information field of a trigger frame. The example User Information field illustrated in FIG. 14 includes a number of sub-fields, including an AID sub-field 1402, an RU Allocation sub-field 1404, a Coding Type sub-field 1406, an MCS sub-field 1408, a DCM sub-field 1410, and an SS Allocation sub-field 1412. The AID sub-field 1402 may indicate the STA AID. The RU Allocation sub-field 1404 may indicate the RU allocation as usual. Alternatively, if only RU allocation on a basic/minimum channel (e.g., 20 MHz channel in IEEE 802.11ax) is needed (e.g., as signaled using the Common Information field), this sub-field may be modified to use less bits. The Coding Type sub-field 1406, the MCS sub-field 1408, and the DCM sub-field 1410 may be re-interpreted for other purposes if desired. The SS Allocation sub-field 1412 may indicate the spatial streams allocated to the STA.

The USS frame transmitted from one or more STAs to an AP may use an enhanced trigger-based PPDU, which may carry a preamble and no MAC packet. For example, STA2 may be allocated to respond on RU1-2 on both channels 1 and 2 using spatial stream 2. STA2 may transmit an USS frame, such as the USS frame illustrated in FIG. 15.

Figure 15:
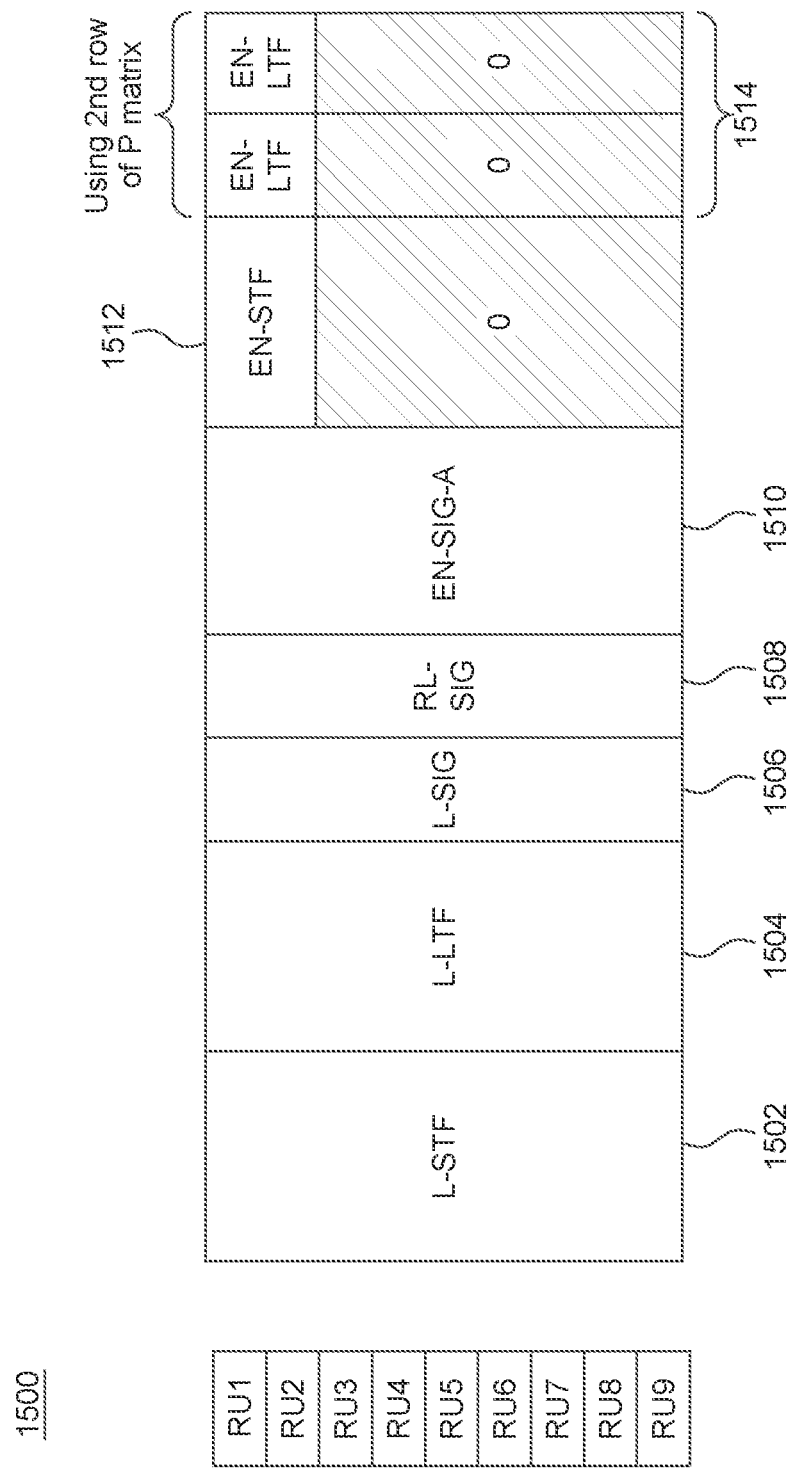
FIG. 15 is a diagram of an example User Specific Sequence (USS) frame.

FIG. 15 is a diagram 1500 of an example USS frame. In the example illustrated in FIG. 15, the USS frame is transmitted by STA2 on channel 1. The legacy part of the preamble, including, for example, the L-STF field 1502, the L-LTF field 1504, the L-SIG field 1506, the RL-SIG field 1508, and the enhanced SIG-A field 1510, may be transmitted using the entire channel. The enhanced part of the preamble, including, for example, the enhanced STF field 1512 and the enhanced LTF field 1514, may be transmitted on the assigned RUs with the assigned spatial stream. The PPDU may be repeated without phase rotation on channel 2.

In another example embodiment of split CTS and USS, the AP may transmit an MU-RTS to a set of STAs with the allocated resources on which the STAs may transmit simultaneous CTS. The MU-RTS may also include NAV information, for example, in the preamble or MAC header, to reserve the medium for the channels on which the MU-RTS is transmitted. When receiving the MU-RTS, a STA may transmit a CTS on the allocated resources indicated in the MU-RTS if the STA is not prevented from transmitting the CTS, for example, by NAV or carrier sensing, and if the STA is the intended recipient of the MU-RTS.

If the AP does not receive a CTS frame in response to the MU-RTS, it may transmit a second trigger frame to poll the availability of the STAs on different channels or sub-channels. Additionally or alternatively, the AP may transmit a trigger frame to poll the availability of the STAs on different channels or sub-channels without first transmitting an MU-RTS frame. The AP may transmit a second trigger frame, which may be a variant of the trigger frame, following receipt of at least one CTS frame from at least one of the intended STAs.

The second trigger frame, or a variant of the trigger frame if transmitted for polling without sending an MU-RTS first, may include one or more of, for the intended set of STAs, a STA ID, allocated resources, user specific sequences or an index of user specific sequences of STAs. The STA ID may be the ID of the STAs, such as the MAC address, compressed MAC address, AID of the STA, Group ID, or one or more specific AIDs that are meant for a specific purpose, such as random access, in the Per User Information field.

With regard to allocated resources, the AP may specify the allocated resources for the STAs to transmit their USS frame to indicate their channel or sub-channel availability, for example, the channels, sub-channels or RUs on which the STAs should indicate their availability. Availability may include, for example, channel conditions, spatial reuse opportunities, or STA capabilities. Additionally or alternatively, the AP may indicate the granularity of RUs and/or channels for which the STAs should indicate their availability. For example, the AP may indicate that STAs may indicate their availabilities for, for example, 26-subcarrier RUs or 52-subcarrier RUs. The size of different RUs may be subject to channels or sub-channels as indicated in, for example, the Common Information field or Per User Information field of the trigger frame. In one embodiment, the AP may indicate that STA 1 should provide its availability on 26-SC RUs in channel 1 and/or 3. In another embodiment, the AP may indicate in the common information field the channel that the set of STAs should provide their availability as well as the RU size for. In yet another embodiment, the bandwidth of the trigger frame may implicitly indicate the channel for which the STAs should provide their availabilities. In another embodiment, the allocated resources on which the STAs are assigned to transmit their CTS, as indicated in the MU-RTS, may indicate the channel for which STAs should provide their availability.

With regard to the user specific sequences or index of user specific sequences, the AP may indicate, for example, in the User Specific field of the trigger frame, the user specific sequence or index or indices of the user specific sequence to be used by the STAs to indicate their availabilities to the AP. Such user specific sequence may be orthogonal. For example, such user specific sequence may be associated with P-matrices or Zadoff-Chu sequences. The index of the USS may be associated with a pre-assigned sequence, such as one or more elements, rows, or columns of pre-defined P-matrices. For example, the USS may be indicated by Spatial Stream numbers, which may be associated with a specific P-matrix. The specific P-matrix used may be indicated in the trigger frame or may be explicitly or implicitly indicated by the indicated channels, sub-channels and/or RU sizes. The AP may assign one or more USSs to a particular STA, for example, on one or more RUs.

The second trigger frame may include duration information in its preamble and/or MAC header to conduct medium reservation to set the NAV at receiving STAs except those STAs that are the intended recipients of the trigger frame. For example, the AP may send the second trigger frame to a group of STAs for UL random access, with one or more allocated channels, and for some RU size.

When a STA receives the trigger frame for polling for channel availability, it may respond by transmitting a USS to the AP. The USS may include a legacy header. The USS may be transmitted as a part of the UL trigger-based PPDU. The USS may only contain a preamble and may be a Null Data Packet. The USS may be modulated by the user specific sequence only on the STA's available channels. The USS may be modulated on all channels, sub-channels and/or RUs in the indicated channel with encoding to indicate available or preferred channels, sub-channels and/or RUs. For UL random access, the STAs may randomly select one or more user specific sequence and one or more available RU, channel and/or sub-channel and transmit its USS using the chosen USS on one or more RU, channel and/or sub-channel.

In embodiments, only STAs that have previously responded to an MU-RTS with a CTS may transmit a USS using the user specific sequence or sequences and resource allocation included in the second trigger frame sent by the AP. In other embodiments, all STAs addressed by the MU-RTS and/or the second trigger frame may respond to the second trigger frame given that it is allowed by the second trigger frame to transmit on resources that are available and/or preferred, even if they have not been able to previously transmit a CTS to respond to the MU-RTS because the indicated resource in the MU-RTS is not available.

The USS may include a duration in its preamble and/or MAC header to conduct medium reservation. The USS from a particular STA may include one or more fields, such as one or more LTF fields, which may be modulated by one or more user specific sequence, such as P-matrix elements, rows and columns. In addition, each symbol, field, and/or subfield may be modulated and/or encoded with 1 or more bits of data, for example, by phase rotation or other methods. Such data may be used to indicate whether the STA is available on a particular RU or channel and may also be used to indicate whether the availability of the STA is limited by spatial reuse and/or channel conditions or user capabilities. Such data may also be used to indicate whether a channel, sub-channel and/or RU is preferred or not preferred.

On a condition that the AP receives one or more USSs from the STAs, it may transmit DL traffic (1228 in FIG. 12) in the form of a DL MU packet to one or more STAs on RUs on which the STAs have indicated availability or preferences in their USS's. Additionally or alternatively, when the AP receives one or more USS from the STAs, it may then transmit another trigger frame to trigger UL data from the set of STAs with resources allocated to STAs (such as sub-channels, RUs, channels, and/or spatial streams) according to the STAs' availability and/or preference indicated by the STAs in their USS.

To prevent AGC at the AP receiver from being overwhelmed by the amount of received energy from simultaneous CTS, the AP may set a desired transmit power for each user. This transmit power may be explicitly signaled in the HE-SIG-B field of the MU-RTS preamble or in the MAC body of the MU-RTS frame. Alternatively, the AP may implicitly signal the transmit power to be used by each STA.

If no power control is used, each STA typically transmits frames with the maximum power allowed. If power control is used, each STA may have previously negotiated a desired transmit power with the AP to ensure that the transmitted signal is received at a desired receive power level. Alternatively, the AP may indicate the desired receive power level to all of the STAs in HE-SIG fields and/or the MAC body of the MU-RTS frame. In embodiments, this may be referred to as the nominal power. In one embodiment, the STAs may transmit the simultaneous CTS with their transmit powers reduced by a value that is a function of the number of users transmitting the simultaneous CTS. For example, with two users, the STAs may transmit at their maximum transmit power or the nominal transmit power reduced by 3 dB or some other function of two. In embodiments, the STAs may not reduce the power by the entire 3 dB to ensure that all hidden nodes are able to over-hear the CTS frames.

In other embodiments, the AP may designate specific STAs as the simultaneous CTS STAs. In such embodiments, the goal of the simultaneous CTS may be to clear the medium rather than to identify whether a STA is ready to transmit data. The AP may identify specific STAs at different corners of the network and may specify their transmit powers. If the AP needs to clear the channel, it may send an MU-RTS to the STAs and require a simultaneous CTS from those specific STAs.

In another embodiment for enabling an AP to identify the specific STAs that reply to MU-RTS with simultaneous CTS, the AP may estimate the number of STAs that reply to the MU-RTS based on the energy received during the simultaneous CTS. This embodiment may be combined with other embodiments, such as with the AP sending transmit power level information explicitly and/or implicitly to each of the STAs, to improve the expected energy. In such a combined embodiment, the AP may, based on the estimate, decide to schedule the users anyway, schedule a new set of users, end the MU transmission (MU TXOP truncation) or initiate a frame exchange to further identify the STAs that are available to send data. If the AP schedules a new set of users, the new set of users may be a subset of users previously addressed by an MU-RTS frame and/or a set of users who may not be addressed by the previous MU-RTS transmission.

Figure 16:
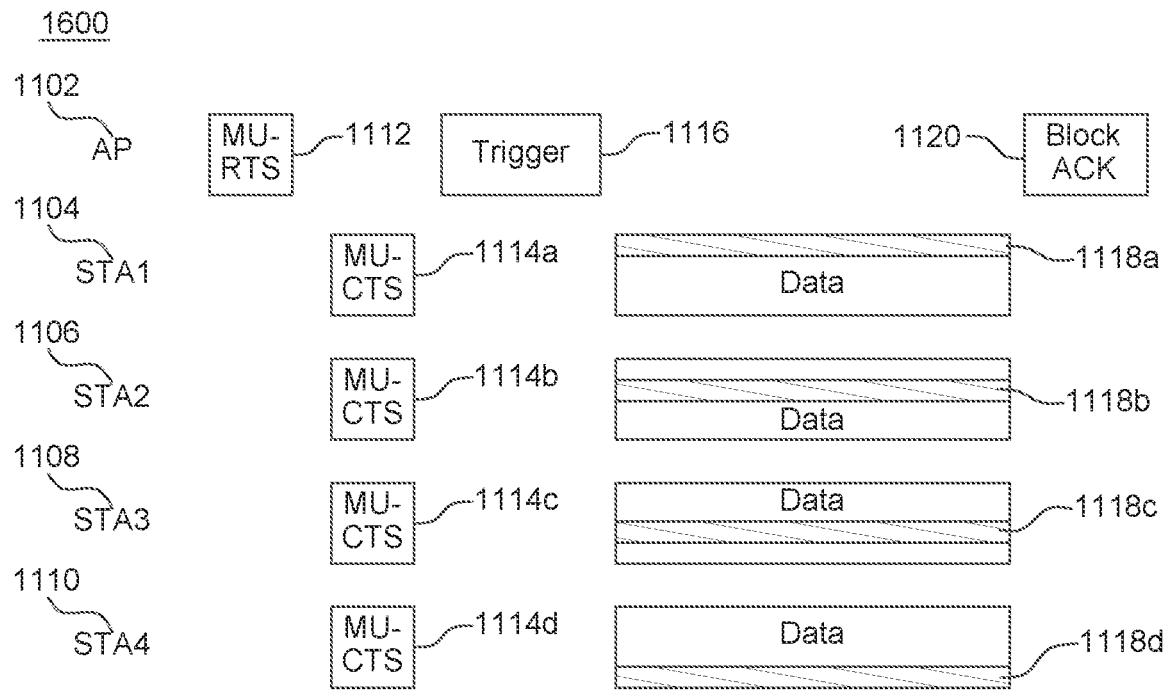
FIG. 16 is a diagram of an example of MU-RTS and simultaneous CTS operation with energy measurement.

FIG. 16 is a diagram 1600 of an example of MU-RTS and simultaneous CTS operation with energy measurement. In the example illustrated in FIG. 16, an AP 1102 sends an MU-RTS 1112 to multiple STAs 1104, 1106, 1108 and 1110. The AP may set the desired transmit power for each STA 1104, 1106, 1108, 1110 in the MU-RTS 1112. This desired transmit power may be signaled in the HE-SIG-B of the MU-RTS 1112 and/or the MAC body of the MU-RTS frame. Alternatively, the AP 1102 may set the desired receive power level and the AP transmit power in the MU-RTS frame (e.g., in the HE-SIG-B field and/or MAC body part). The AP may also set simultaneous CTS power scaling for the STAs. In such an embodiment, each STA 1104, 1106, 1108, 1110 may reduce its maximum or nominal transmit power by the amount specified in the MU-RTS. The AP may also require the STAs to change their transmit power and use either their nominal or maximum transmit powers during the simultaneous CTS transmission.

An inter-frame space (e.g., SIFS duration) after the MU-RTS 1112, the STAs 1104, 1106, 1108, and 1110 may send simultaneous CTSs 1114a, 1114b, 1114c, 1114d to the AP via an MU-CTS (not shown), and the AP 1102 may measure the received energy. On a condition that the received energy is greater than a threshold, the AP 1102 may assume that most of the STAs sent the simultaneous CTS. An inter-frame space (e.g., SIFS duration) after the AP receives the simultaneous CTS, the AP 1102 may send a regular trigger frame 1116 to schedule the user data. The STAs 1104, 1106, 1108 and 1110 may send their data 1118a, 1118b, 1118c, 1118d, respectively, on the scheduled resource, and, in response, the AP 1102 may send a block acknowledgement (ACK) 1120 to the STAs 1104, 1106, 1108 and 1110.

Figure 17:
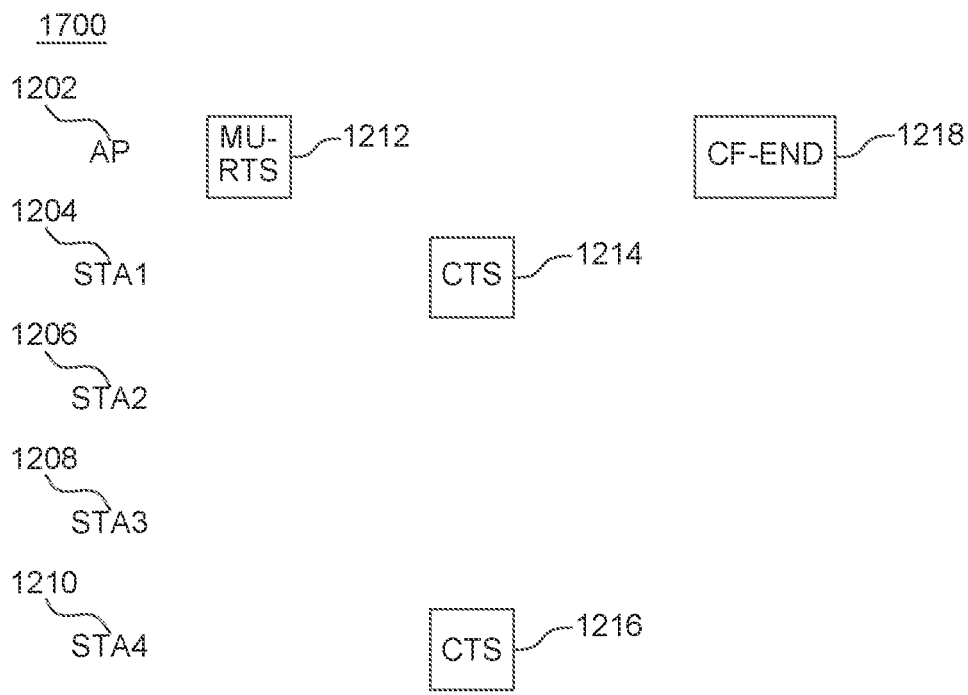
FIG. 17 is a diagram of another example of MU-RTS and simultaneous CTS operation with energy measurement.

FIG. 17 is a diagram 1700 of another example of MU-RTS and simultaneous CTS operation with energy measurement. In the example illustrated in FIG. 17, the AP 1202 sends the MU-RTS 1212 to multiple STAs 1204, 1206, 1208, and 1210. The AP 1202 may set the desired transmit power for each STA 1204, 1206, 1208, 1210 in the MU-RTS 1212 similar to the embodiment described above with respect to FIG. 16. An inter-frame space (e.g., SIFS duration) after the MU-RTS 1212, the STAs 1204 and 1210 that are able to detect the MU-RTS 1212 may send simultaneous CTSs 1214, 1216 to the AP 1202, and the AP 1202 may measure the received energy.

On a condition that the received energy is less than a threshold, the AP 1202 may assume that multiple users failed to reply during the simultaneous CTS and may take steps to resolve this failure. In the embodiment illustrated in FIG. 17, the AP 1202 may cancel the subsequent transmission by sending a CF-END frame 1218, or a similar frame, an inter-frame space (e.g., SIFS duration) after the AP 1202 receives the simultaneous CTS.

Figure 18:
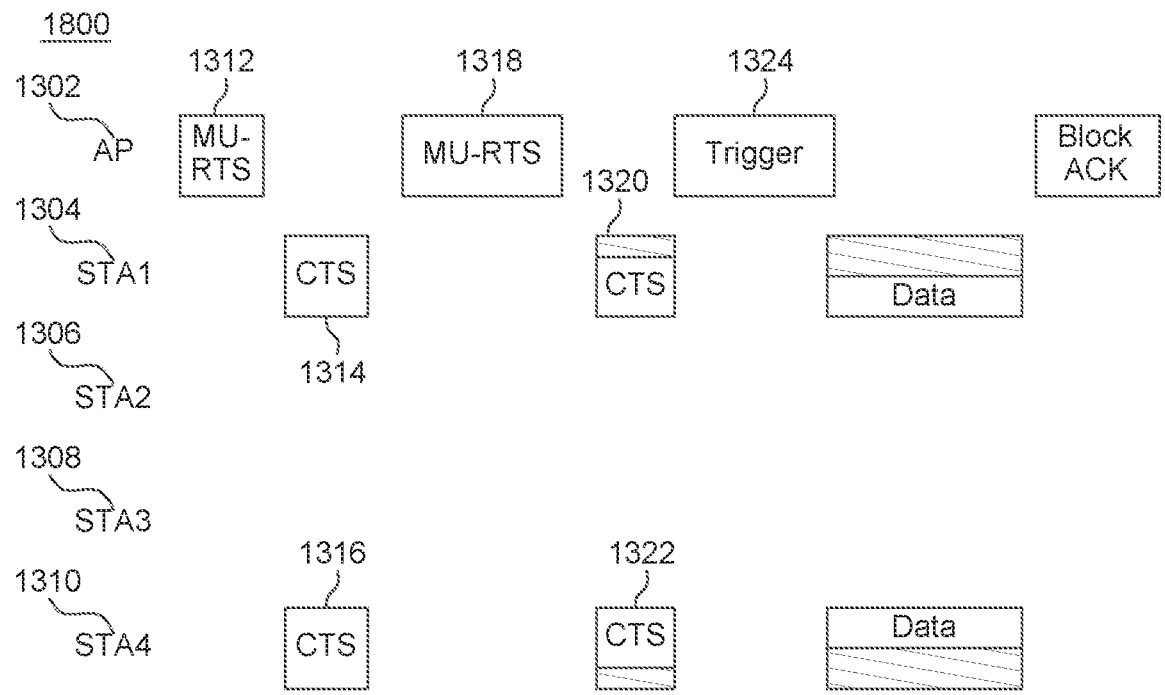
FIG. 18 is a diagram of an example of MU-RTS with simultaneous CTS with CTS trigger.

FIG. 18 is a diagram 1800 of an example of MU-RTS with simultaneous CTS with CTS trigger. In the example illustrated in FIG. 18, the AP 1302 sends the MU-RTS 1312 to multiple STAs 1304, 1306, 1308, and 1310. The AP 1302 may set the desired transmit power for each STA 1304, 1306, 1308, 1310 in the MU-RTS 1312 similar to the embodiments described above with respect to FIGS. 12 and 13. An inter-frame space (e.g., SIFS duration) after the MU-RTS 1312, the STAs 1304 and 1310 that are able to detect the MU-RTS 1312 may send simultaneous CTSs 1314, 1316 to the AP 1302, and the AP 1302 may measure the received energy.

On a condition that the received energy is less than a threshold, the AP 1302 may assume that multiple users failed to reply during the simultaneous CTS and may take steps to resolve this failure. In the embodiment illustrated in FIG. 18, the AP 1302 may then send a separable MU-RTS 1318 an inter-frame space (e.g. SIFS duration) after receiving the simultaneous CTS to enable it to identify the specific STAs that are ready to send data. In the MU-RTS frame, the AP 1302 may indicate that CTS frames transmitted using an MU-PPDU are expected. The following CTS frames 1320, 1322 may use an OFDMA-based CTS, a UL_MU-MIMO based CTS, and/or a code-separable CTS. However, the CTSs should be separable and identifiable. In embodiments, on a condition that a STA is ready to send information with a packet size less than a threshold, the STA may send the information in place of the scheduled CTS.

An inter-frame space (e.g., SIFS duration) after the AP receives the CTSs 1320, 1322, the AP may send a regular trigger frame 1324 to schedule data transmission. The AP 1302 may also reserve some resources for a Random Access CTS. The AP may then schedule the user in the subsequent trigger frame.

When an AP transmits a trigger frame or a DL MU frame, one or more STAs may respond using UL MU PPDUs. When a STA that is supposed to transmit on certain sub-channels, channels or resource blocks fails to transmit, other STAs may erroneously assume that the medium is free and may start to use the channel, sub-channels or resources for their own transmissions. In another example, when an AP transmits a trigger frame for random access, some channels, sub-channels or resource blocks may be empty since no STAs have chosen the channel, sub-channels or resource blocks for UL transmissions. In addition, when a number of STAs fail to transmit over their channels, sub-channels or resource blocks, the total energy detected over the entire or partial channel may be below a detection threshold, such as Energy Detection (ED), OBSS_ED, Signal Detection (SD), or OBSS_SD level. STAs, such as OBSS STAs, may start to transmit using the channel, sub-channels or partial channels, causing interruptions and interference to the ongoing transmissions. This may be particularly severe when cascading structures with alternating DL and UL SU and/or MU transmissions are used.

An AP may occupy the empty channels, sub-channels or resource blocks not used in UL transmissions by transmitting packets or energy on the empty channels, sub-channels or resource blocks to prevent other STAs, such as OBSS STAs, from using all or part of the channels, sub-channels or resource blocks for their transmissions. To do this, after transmitting a trigger frame, DL MU PPDU, DL PPDU, or aggregated packet or packets that include a trigger frame soliciting responses from multiple STAs, an AP may monitor all channels, sub-channels and resource blocks in which response frames are expected. These channels, sub-channels and resource blocks may have been indicated in the resource allocation, such as in the previous trigger frames, DL MU PPDUs, or DL PPDUs.

If within a certain period (e.g., after a S IFS period) the AP has detected the start of PPDUs (e.g., as reported by the PHY-RXStart.indication primitive from the PHY layer), the AP may continue receiving these packets. If within a certain period (e.g., after a SIFS period) the AP has not detected the start of the PPDUs on one or more channels, sub-channels or resource blocks, the AP may, after a period (e.g., a PIFS period), transmit a packet or a null data packet (NDP) on one or more of the channels, sub-channels or resource blocks or transmit energy on one or more subcarriers within these channels, sub-channels or resource blocks to keep them occupied. Such a transmission on the unused channels, sub-channels or resource blocks may use a narrower spectral mask than the channels, sub-channels or resource blocks in order to prevent interference for the channels, sub-channels or resource blocks on which the AP is currently receiving frames. Such a transmission on these unused channels, sub-channels or resources blocks may also be conducted by using one or more TX/RX chains that may or may not have been previously used for reception.

In order to support reception of the trigger-based UL PPDUs, the PHY-RXStart.indication primitive may need to be updated. In particular, the parameter for PHY-RXstart.indication, the RXVector, may need to be enhanced. When the frame format is detected to be MU PPDU or trigger-based UL PPDU, the RXVector may contain a number of users. The channels, sub-channels or resource blocks used by each user may be listed. Such number of users and channels, sub-channels or resource blocks used by each user may be included in the TXVECTOR as well. In addition, the unused channels, sub-channels or resource blocks may be identified in the RXVECTOR. Similarly, the MCSs, TXPower, and RXPower (e.g., receiver channel power indicator (RCPI)), may be specified in the TXVector and/or RXVector for each user, channel, channel or resource block associated with the MU PPDU or trigger based UL PPDU.

Another new issue may concern protection from legacy devices, which may be more important in densely deployed systems than protection from hidden notes. In embodiments, MU half protection capability may be used to indicate that a device is capable of performing half protection for MU transmissions, and the MU half protection capability may be set in the MU capability field, other capability field and/or other information element, which may be transmitted in a Beacon frame, an Association or Re-Association Request/Response frame, Prob Request/Response frame and/or other type of frame by the AP and STAs. Alternatively, DL MU half protection, UL MU half protection and cascading half protection capabilities may be separately indicated in the above-mentioned fields and frames.

Figure 19:
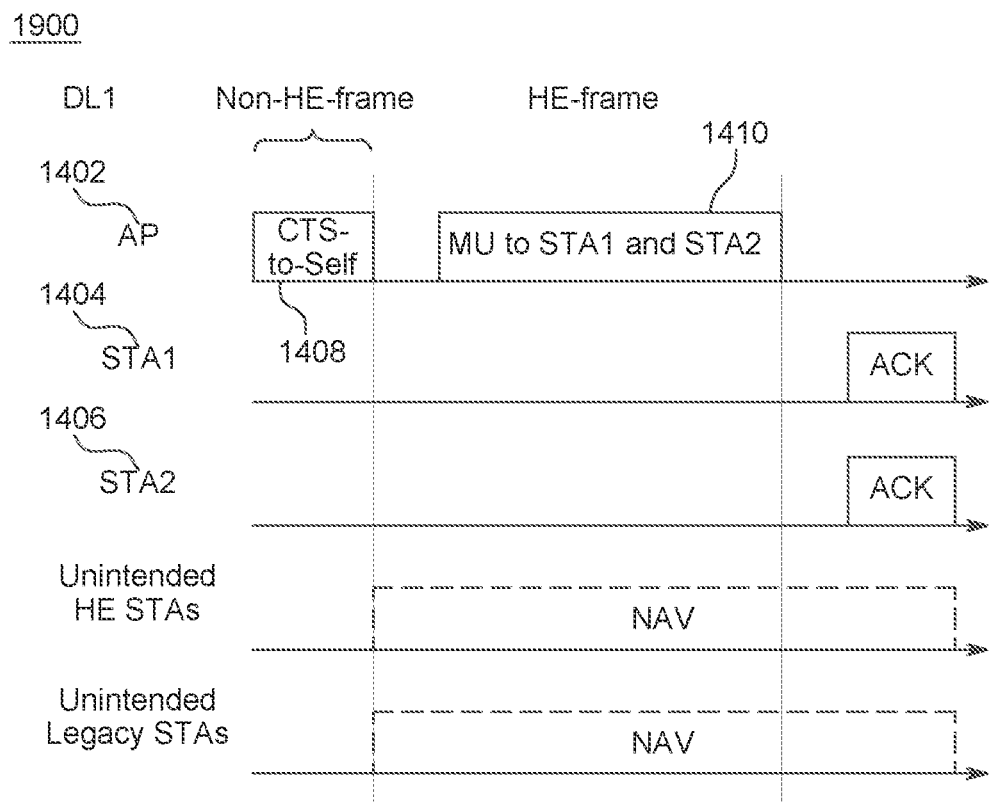
FIG. 19 is a diagram of an example of half protection for DL MU transmission.

FIG. 19 is a diagram 1900 of an example of half protection for DL MU transmission. In the example illustrated in FIG. 19, an AP 1402 may start a DL MU TXOP using a CTS-to-Self or a CTS-to-AP frame 1408. The random access (RA) field in the frame 1408 may be set to the MAC address of the AP. The duration field may be set to the end of the DL MU TXOP. The AP 1402 may continue transmitting a DL MU PPDU 1410 to STAs 1404 and 1406 an inter-frame space (e.g., SIFS period) after the end of CTS-to-Self or CTS-to-AP frame 1408.

Figure 20:
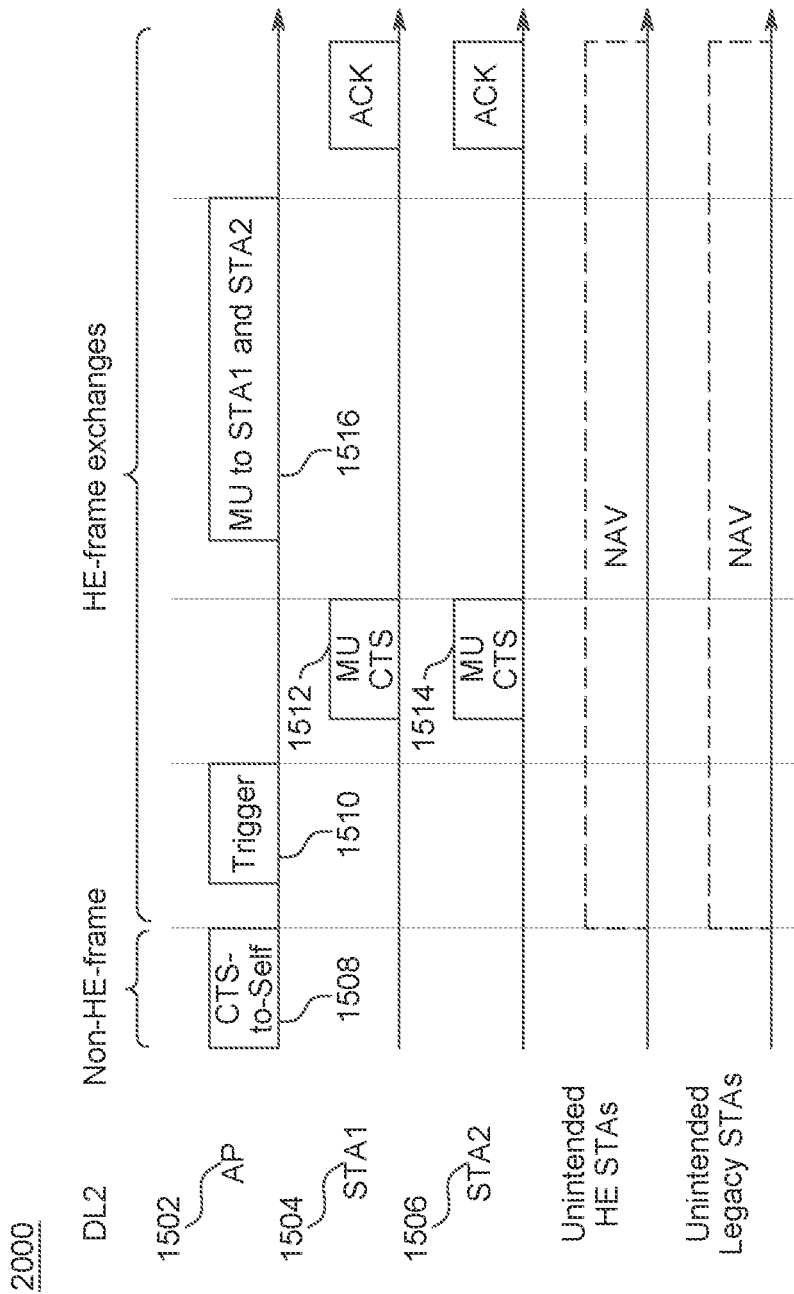
FIG. 20 is a diagram of another example of half protection for DL MU transmission.

FIG. 20 is a diagram 2000 of another example of half protection for DL MU transmission. In the example illustrated in FIG. 20, an AP 1502 may start a DL MU TXOP using a CTS-to-Self or a CTS-to-AP frame 1508. The RA field in the frame may be set to the MAC address of the AP. The duration field may be set to the end of the DL MU TXOP. The AP may continue transmitting a trigger frame 1510 an inter-frame space (e.g., SIFS period) after the end of CTS-to-Self or CTS-to-AP frame 1508. The trigger frame 1510 may indicate that it has a trigger type MU-RTS or other type.

STAs, such as STAs 1504 and 1506, that are addressed by the trigger frame 1510 may transmit a newly defined MU CTS frame 1512, 1514 an inter-frame space (e.g., SIFS period) after the end of the trigger frame 1510 if the NAV at the STAs receiving the MU-RTS frame indicate that the medium is idle. In an alternative method, the STAs may transmit CTS frames that may be carried using an MU PPDU. In response to receiving the MU CTS frames 1512, 1514, the AP 1502 may know which STAs are ready to receive DL MU packets, and the AP 1502 may schedule the available STAs for DL transmission using an MU frame 1516.

Figure 21:
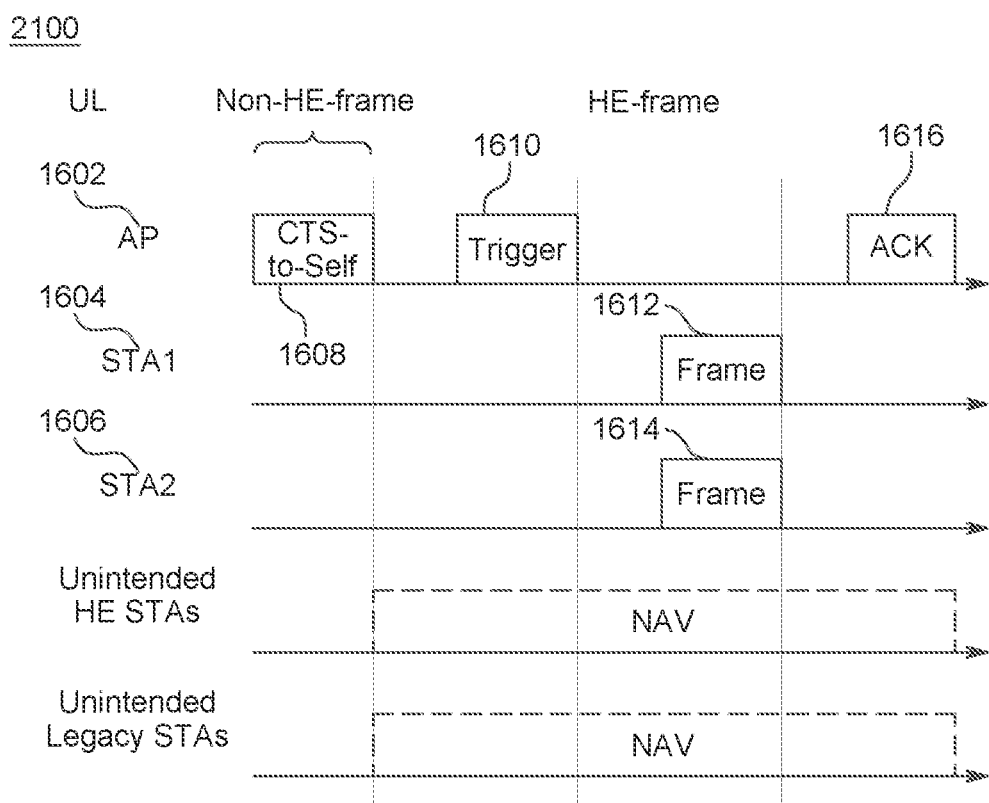
FIG. 21 is a diagram of an example of half protection for uplink (UL) MU transmission.

FIG. 21 is a diagram 2100 of an example of half protection for UL MU transmission. In the example illustrated in FIG. 21, an AP 1602 starts a UL MU TXOP using a CTS-to-Self or a CTS-to-AP frame 1608. The RA field in the frame may be set to MAC address of the AP. The duration field may be set to the end of the UL MU TXOP. The AP may continue transmitting a DL trigger frame 1610 an inter-frame space (e.g., SIFS period) after the end of the CTS-to-Self or CTS-to-AP frame 1610.

STAs 1604 and 1606 triggered by the trigger frame 1610 may update the NAV set by the preceding CTS-to-Self/CTS-to-AP frame 1608 and transmit UL MU PPDU frames 1612, 1614 an inter-frame space (e.g., SIFS period) after the end of the trigger frame transmission 1610. The AP 1602 may respond with an ACK or Multi-STA ACK 1616.

Figure 22:
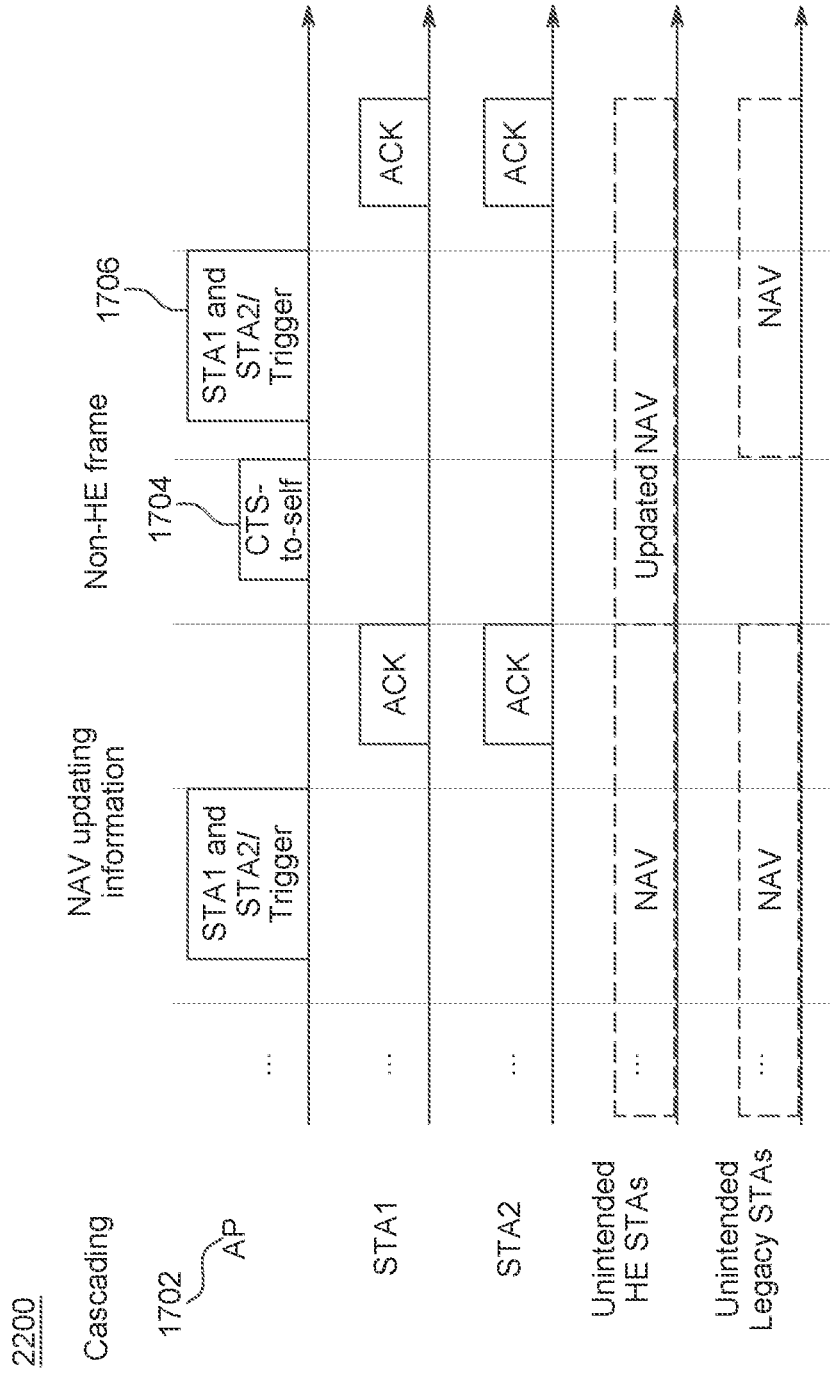
FIG. 22 is a diagram of an example of half protection for cascading MU transmission.

FIG. 22 is a diagram 2200 of an example of half protection for cascading MU transmission. An AP 1702 may start a cascading MU-TXOP using or not using a CTS-to-Self or a CTS-to-AP frame (not shown). In the example illustrated in FIG. 22, in the middle of the cascading transmission, the AP 1702 performs a half protection using a CTS-to-Self or a CTS-to-AP frame 1704. The RA field in the frame may be set to the MAC address of the AP. The duration field may be set to the end of the cascading MU TXOP. The AP may use the CTS-to-Self or CTS-to-AP frame 1704 to update, extend and/or reduce the NAV setting for the current MU TXOP. The AP may continue transmitting a DL MU PPDU 1706 an inter-frame space (e.g., SIFS period) after the end of CTS-to-Self or CTS-to-AP frame 1704. The DL MU PPDU 1706 may carry a trigger frame, control frames, management frames, and/or data frames.

MU dual protection capability, which may be used to indicate that the device is capable of performing dual protection for MU transmissions, may be set in the MU capability field, other capability field and/or other information element, which may be transmitted in a Beacon frame, Re-Association or Association Request/Response frame, a Prob Request/Response frame and/or other type of frame by the AP and STAs. Alternatively, DL MU dual protection, UL MU dual protection and cascading dual protection capabilities may be separately indicated in the above-mentioned fields and frames.

Figure 23:
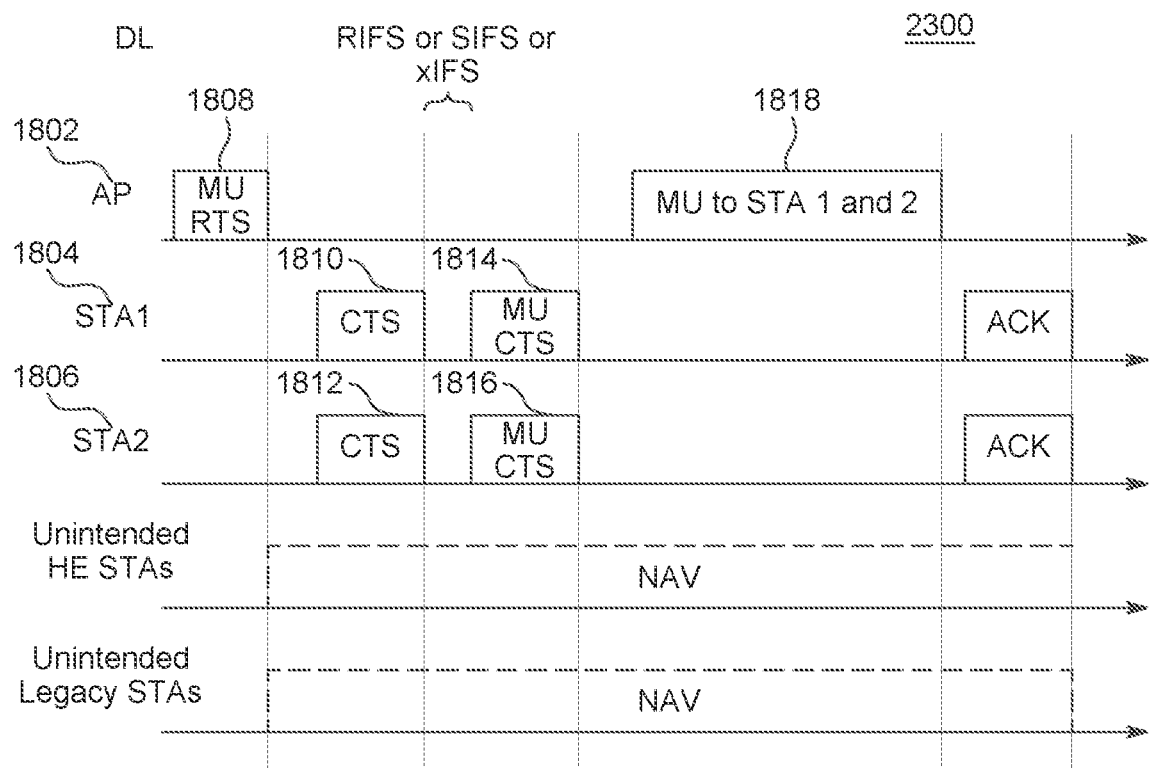
FIG. 23 is a diagram of an example of dual protection for a DL MU transmission.

FIG. 23 is a diagram 2300 of an example of dual protection for a DL MU transmission. In the example illustrated in FIG. 23, an AP 1802 starts a DL MU TXOP using an MU-RTS/trigger frame 1808. In the MU-RTS/trigger frame 1808, the AP 1802 may indicate that a dual protection mechanism is being used. STAs 1804 and 1806 addressed by the MU-RTS frame 1808 may transmit CTS frames 1810, 1812 an inter-frame space (e.g., SIFS period) after the end of the MU-RTS/trigger frame 1808 if the NAV at the STA receiving the MU-RTS frame indicates that the medium is idle in some or all of the sub-channels.

STAs 1804 and 1806 addressed by the MU-RTS frame 1808 may transmit an MU-CTS frame 1814, 1816 an inter-frame space (e.g., SIFS period) after the end of the CTS frames 1810, 1812 if the NAV at the STA receiving the MU-RTS frame indicates that the medium is idle in some or all of the sub-channels. The transmission of MU-CTS frame 1814, 1816 may be on a resource unit (RU) basis or a 20 MHz sub-channel basis. The MU-CTS frame 1814, 1816 may be a frame modified from a CTS frame. The MU-CTS frame 1814, 1816 may carry the STA ID, STA MAC address and/or STA signature, which the AP may use to distinguish the transmitters of the MU-CTS frames 1814, 1816. The MU-CTS frames 1814, 1816 may also carry information about the sub-channel and/or RU preference indication that the AP 1802 may use for resource allocation or scheduling. The MU-CTS frames 1814, 1816 may be transmitted in a frequency/time/space/power/code division multiplexing way. The AP 1802 may continue transmitting a DL MU PPDU 1818 an inter-frame space (e.g., SIFS period) after the end of MU-CTS frames 1814, 1816.

Figure 24:
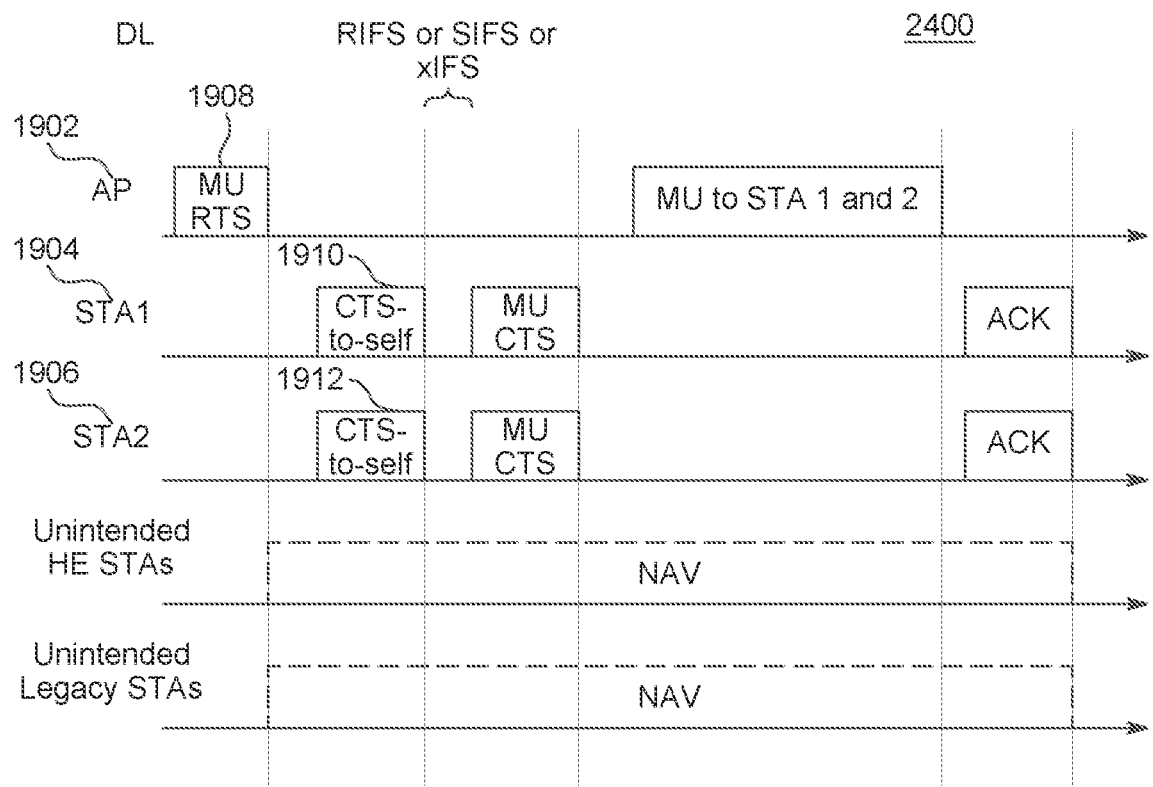
FIG. 24 is a diagram of another example of dual protection for a DL MU transmission.

FIG. 24 is a diagram 2400 of another example of dual protection for a DL MU transmission. In the example illustrated in FIG. 24, an AP 1902 starts a DL MU TXOP using a MU-RTS/trigger frame 1908. In the MU-RTS/trigger frame 1908, the AP 1902 may indicate that a dual protection mechanism is being used. Instead of transmitting a CTS frame an inter-frame space after the MU-RTS frame as in FIG. 23, in the example illustrated in FIG. 24, the STAs 1904 and 1906 addressed by the MU-RTS frame 1908 transmit CTS-to-Self frames 1910, 1912 an inter-frame space (e.g., SIFS period) after the end of the MU-RTS frame 1908 if the NAV at the STA receiving the MU-RTS frame indicates that the medium is idle in some or all of the sub-channels.

Figure 25:
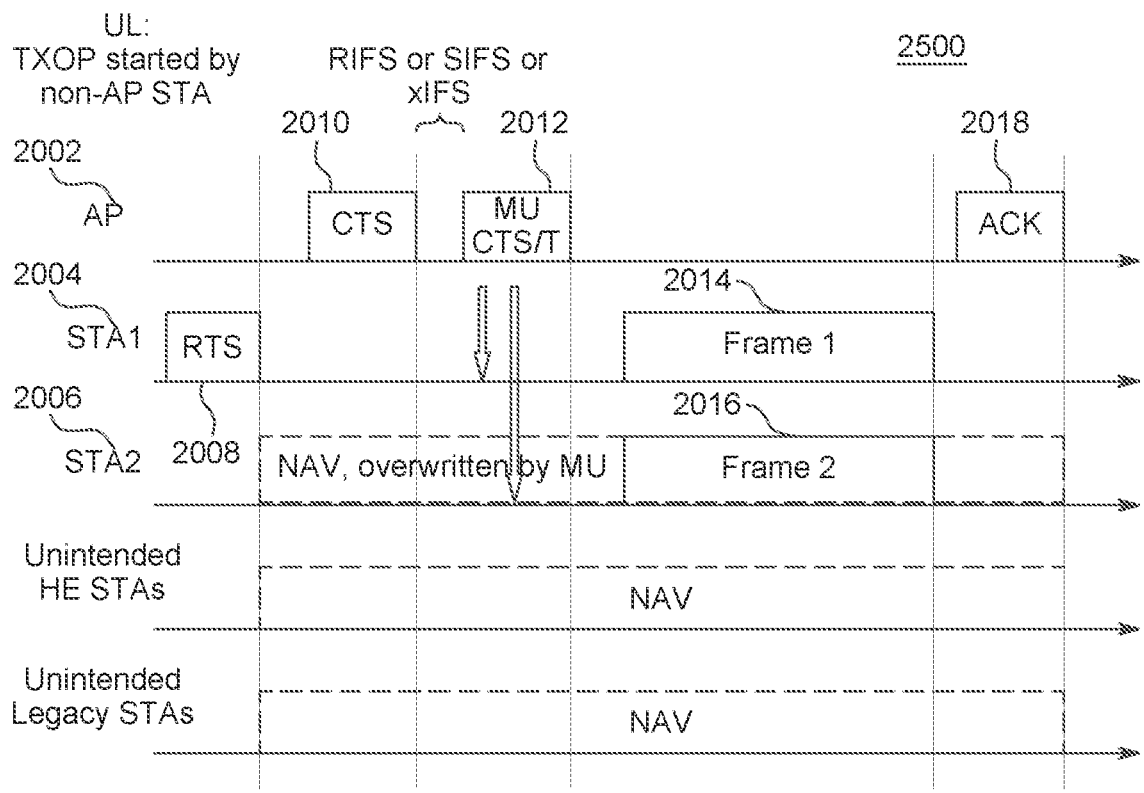
FIG. 25 is a diagram of an example of dual protection for a UL MU transmission.

FIG. 25 is a diagram 2500 of an example of dual protection for a UL MU transmission. In the example illustrated in FIG. 25, a STA 2004 begins a UL transmission using an RTS frame 2008. An AP 2002 may, however, decide to use the time slot for a UL MU TXOP. If this is the case, the AP 2002 addressed by the RTS frame 2008 may transmit a CTS frame 2010 to the STA 2004. If both the STA 2004 and the AP 2002 have the capability for UL dual protection, the AP 2002 may transmit an MU-CTS/trigger frame 2012 an inter-frame space (e.g., xIFS period) after the end of the CTS transmission 2010. The xIFS may be equal to or less than a SIFS period, such that the STA 2004 may not be able to start a normal data transmission a SIFS period after receiving the CTS frame 2010. In the MU-CTS/trigger frame 2012, the AP 2002 may indicate and schedule a UL MU TXOP. STAs addressed by the MU-RTS frame may transmit CTS frames an inter-frame space (e.g., SIFS period) after the MU-RTS frame if the NAV at the STA receiving the MU-RTS frame indicates that the medium is idle in some or all of the sub-channels. STAs 2004 and 2006 addressed by the MU-CTS frame 2012 may transmit UL MU frames 2014, 2016 an inter-frame space (e.g., SIFS period) after the MU-CTS frame 2012. The AP 2002 may transmit ACK frames and/or a multi-user BA 2018 after the reception of UL MU frames 2014, 2016.

With cascading MU TXOP, the dual protection mechanism for both the DL and UL may be applied. The protection frame exchanges may occur at the beginning and/or in the middle of the cascading MU TXOP. The protection mechanism may be initiated by an AP or a non-AP STA. The protection mechanism in the middle of the cascading MU TXOP may be used to update the NAV setting. The updating may include extending/reducing/truncating the current TXOP.

Figure 26:
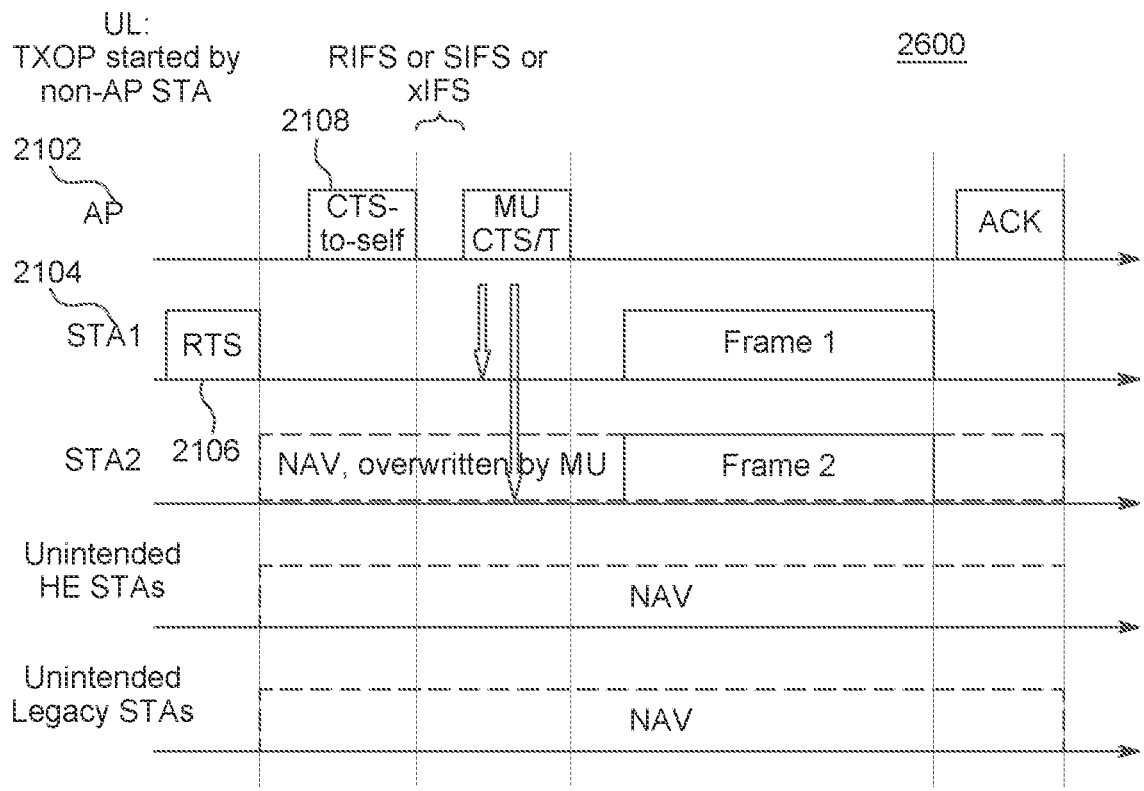
FIG. 26 is a diagram of another example of dual protection for a UL MU transmission.

FIG. 26 is a diagram 2600 of another example of dual protection for a UL MU transmission. In the example illustrated in FIG. 26, instead of transmitting a CTS frame a SIFS period after the RTS frame, the AP 2102 may transmit a CTS-to-Self frame 2108 an inter-frame space (e.g., xIFS period) after the end of the RTS frame 2106 if the NAV at the AP 2102 receiving the RTS frame 2106 indicates that the medium is idle in some or all of the sub-channels. In this scenario, the STAs and the AP may indicate that they have capability for UL dual protection. Thus, the STAs may expect a CTS or CTS-to-Self frame after transmitting an RTS frame.

In embodiments, a system may need to mandate protection mechanisms (e.g., RTS/CTS protection, MU-RTS/CTS protection or other type of protection) for any directional transmission starting from the legacy preamble. A capability field may be set to indicate that a STA is capable of directional transmission starting from the beginning of the packet, including both the legacy part and HE part. The capability information may be included in the HE MU capability field.

Figure 27:
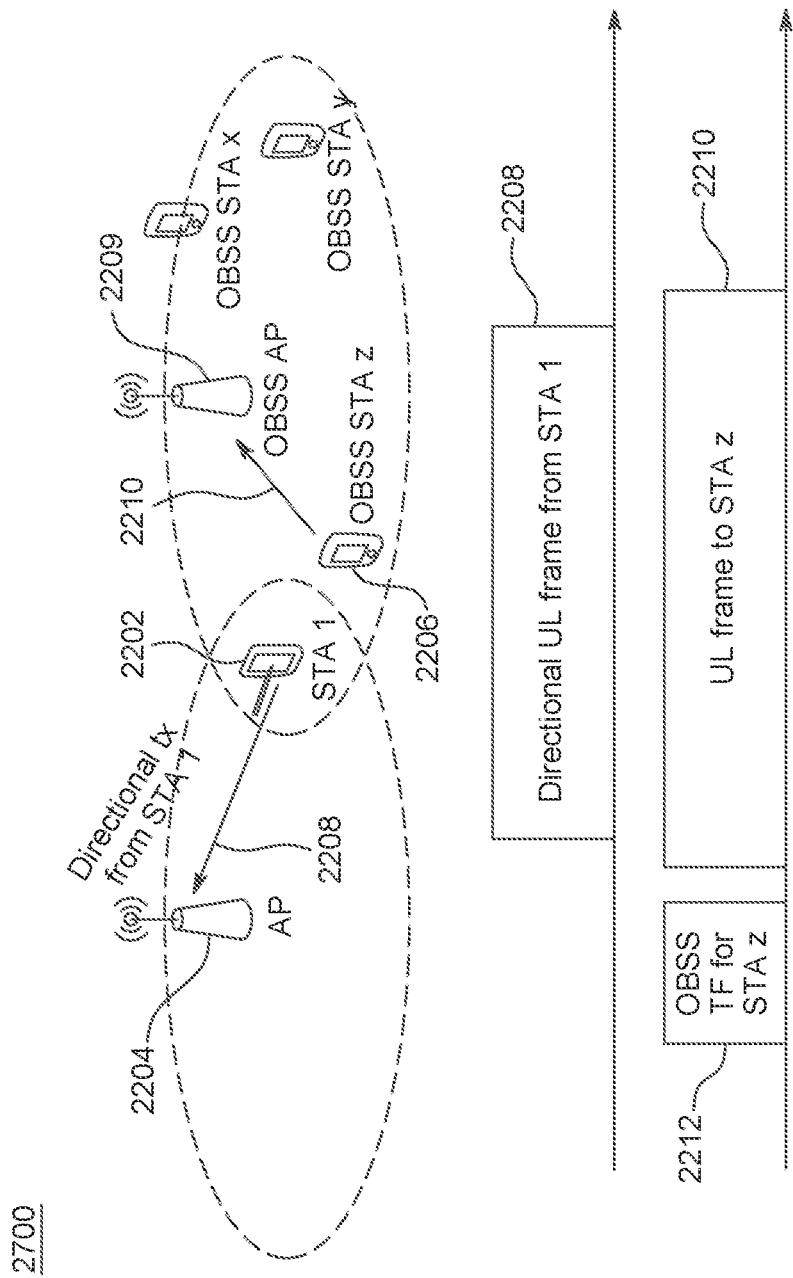
FIG. 27 is a diagram illustrating a situation where an OBSS network allocation vector (NAV) unnecessarily prohibits a directional transmission.
Figure 28:
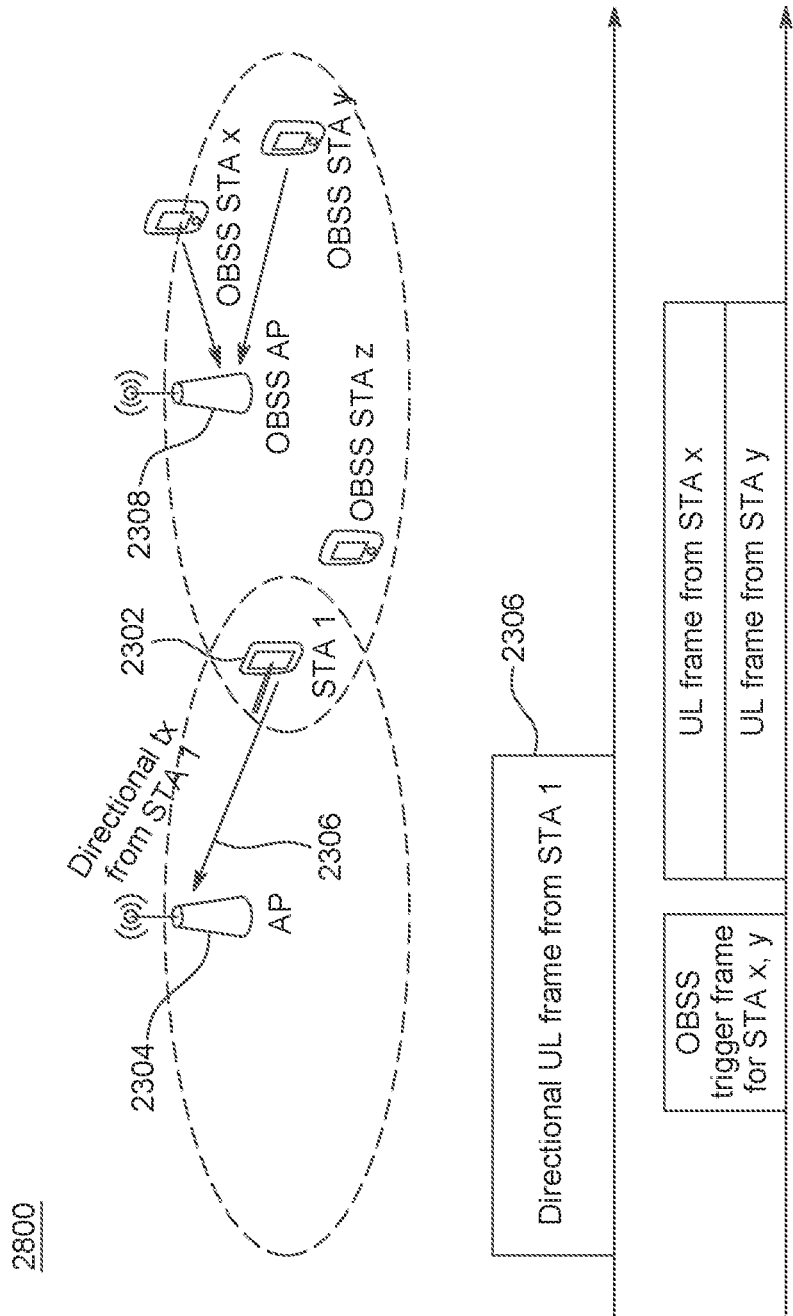
FIG. 28 is a diagram illustrating a situation where an OBSS does not see a directional transmission from a neighboring BSS.

Another issue may concern the use of directional transmissions when an OBSS NAV is set. FIG. 27 is a diagram 2700 illustrating a situation where an OBSS NAV unnecessarily prohibits a directional transmission. In the example illustrated in FIG. 27, STA 2202 is capable of sending a UL directional transmission 2208 to AP 2204. However, its TXOP is constrained by an OBSS NAV set by an OBSS trigger frame 2212 from OBSS AP 2209 and the responding OBSS UL frame 2210 from OBSS STA 2206. FIG. 28 is a diagram 2800 illustrating a situation where an OBSS does not see a directional transmission from a neighboring BSS. In the example illustrated in FIG. 28, the STA 2302 sends a directional transmission 2306 to an AP 2304. The OBSS AP 2308 does not see the directional transmission 2306 and starts its own TXOP, which may cause the OBSS NAV to be set. The STA 2306 may later refrain from sending further directional transmissions because the OBSS NAV is set. Embodiments described herein may address these issues by enabling a STA, such STA 2202 or 2302, to determine whether its UL directional transmission may occur while the OBSS NAV is set. One way to do this may be to send OBSS facilitating information (OFI) that STAs may detect and use to determine whether they may send UL directional transmissions while an OBSS NAV is set.

Figure 29A:
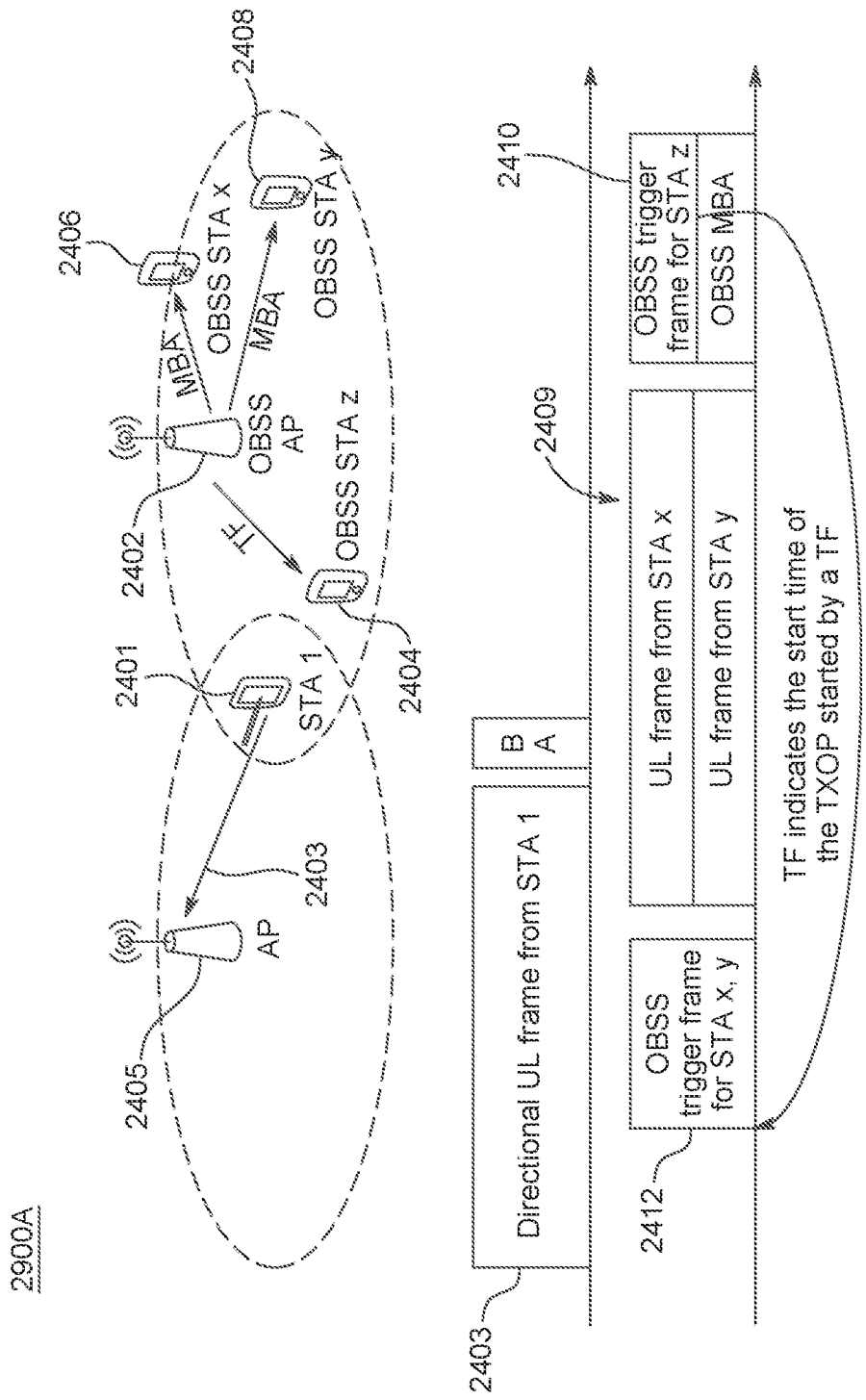
FIGS. 29A and 29B are diagrams of an example of using OBSS facilitate information (OFI) to indicate to as station (STA) whether directional transmissions may be sent while an OBSS NAV is set.
Figure 29B:
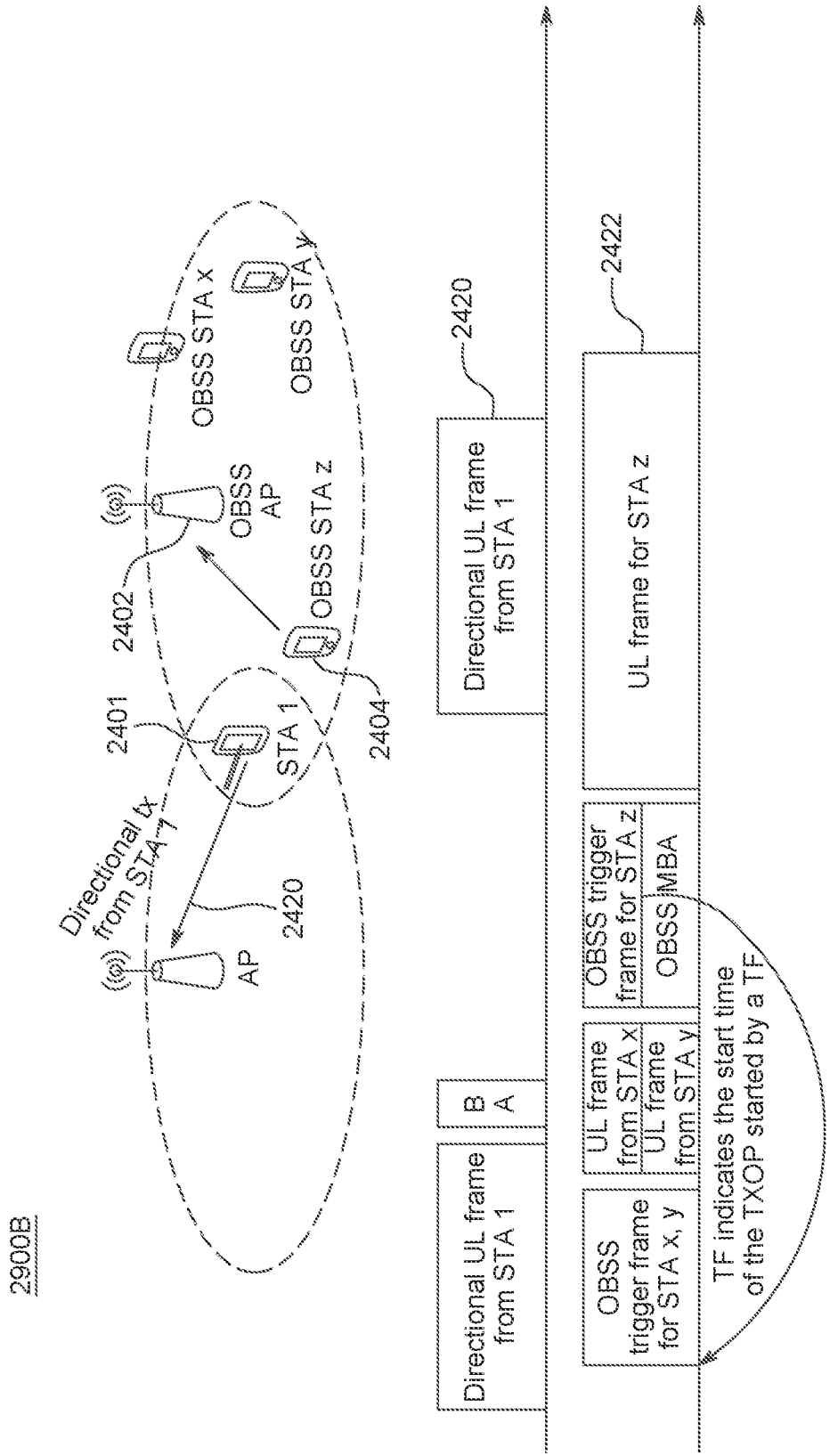

FIGS. 29A and 29B are diagrams 2900A and 2900B of an example of using OFI to indicate to a STA whether directional transmissions may be sent while an OBSS NAV is set. In the example illustrated in FIGS. 29A and 29B, a STA 2401 sends a first directional UL frame 2403 to AP 2405. Meanwhile, the OBSS AP 2402 begins a TXOP by transmitting an OBSS trigger frame 2412 for STAs 2406 and 2408. The trigger frame 2412 may include the OFI. The OFI may carry information such as, for example, the start time of the TXOP started by the trigger frame 2412 (e.g., a time stamp or a time offset regarding a known reference), a CCA threshold for the AP 2402 and/or an average receive power level during the CCA sensing period before the first trigger frame 2412. In embodiments, the OFI may be carried in a DL control or management frame (e.g., a trigger frame or a multi-STA block ACK frame), transmitted by the AP 2402, and/or a UL control/management frame (e.g., ACK frame) transmitted by non-AP STAs.

The OFI may also be signaled in subsequent trigger frames or other DL frames from the OBSS AP 2402 to facilitate the STA 2401 learning the impact, if any, of its previous directional transmission 2403. In the example illustrated in FIG. 29A, for example, the OBSS AP 2402 may send the OFI in an OBSS trigger frame 2410 for OBSS STA 2404, which the STA 2401 may overhear. From the OFI, the STA 2401 may conclude that the OBSS AP 2402 did not observe its previous directional transmission 2403 or the DL BA (not shown) as interference based on the determination that the OBSS AP 2402 started a TXOP in the middle of the directional transmission 2403 from STA 2401 and the determination that the OBSS UL/DL PPDU 2409 that overlapped with the directional transmission 2403 and the DL BA were correctly received by the OBSS AP 2402.

Based on this determination, the STA 2401 may continue decrementing its backoff timer on a condition that the determination was made that the directional transmission 2403 did not interfere with the OBSS, the OBSS NAV was set by the second OBSS trigger frame 2410 based on possible alternative physical sensing mechanisms and/or virtual physical sensing mechanisms and the intra-BSS NAV is not set. The STA 2401 may perform another directional transmission during this duration even though the OBSS NAV is set. For example, as illustrated in FIG. 29B, the STA 2401 may send another directional transmission 2420 that may overlap, for example, with a UL frame transmission 2422 from the OBSS AP 2402 to the STA 2404 while the OBSS NAV is set. The STA 2401 may or may not truncate the directional transmission 2420 that may be overlapping with an OBSS transmission, such as the UL frame transmission 2422, according to the OBSS TXOP duration.

Without OBSS NAV, STA 2401 may use the same directional antenna pattern for carrier sensing as well as for receiving. This carrier sensing may ensure that the OBSS transmission will not cause interference when the STA 2401 receives a DL ACK from the OBSS AP 2402. To avoid intra BSS collision, and to prevent interference to the OBSS AP 2402 during the OBSS UL duration, the STA 2401 may send an RTS frame in a directional transmission to its associated AP 2405, and the AP 2405 may reply with a CTS frame using an omni-directional transmission to reserve the air time in the BSS.

Another new issue may concern the NAV set by an RTS frame being subject to reset by a STA that overhears the RTS frame if neither the responding CTS frame nor the beginning of a data frame are overheard by the STA. For example, a STA that uses information from an RTS frame as the most recent basis to update its NAV setting may be permitted to reset its NAV if no PHY-RXSTART.indication primitive is received from the PHY during a period with a duration of (2×aSIFSTime)+(CTS_Time)+aRxPHYStartDelay+(2× aSlotTime) starting at the PHY-RXEND.indication primitive corresponding to the detection of the RTS frame. This behavior may be necessary for HE-STAs because the intended recipient of an (MU-)RTS frame may not respond due to interference, OBSS NAV busy, or other reasons.

An HE-preamble may be designed such that a STA may acquire the TXOP duration (NAV)/color information without decoding the entire MU PPDU frame. However, it is not clear how a STA would know that the TXOP duration set by a PPDU is subject to NAV reset if it only decodes up to the HE-preamble. Embodiments described herein may address this issue, for example, by providing different TXOP duration values in the HE-preamble and MAC header.

In embodiments, the TXOP duration in HE-SIG-A may be made different/shorter than the duration/NAV in the MAC header of a frame with a NAV that is subject to reset. For example, the duration in the MAC header of an OBSS MU-RTS may be set to T to signal the NAV setting of the corresponding CTS frame. While the TXOP duration in the HE-SIG-A field of the MU-RTS frame may be set to a_t, which may be the duration needed to complete, for example, a SIFSTime plus the number of microseconds required to transmit the CTS frame at a data rate determined by the MU-RTS frame. Alternatively, the transmitter of an MU-RTS frame may always set the TXOP duration in the HE-SIG-A field the same as the duration in the MAC header, but it may perform PIFS recovery or TXOP truncation (CF-End) if no response is received from the intended receiver.

Figure 30:
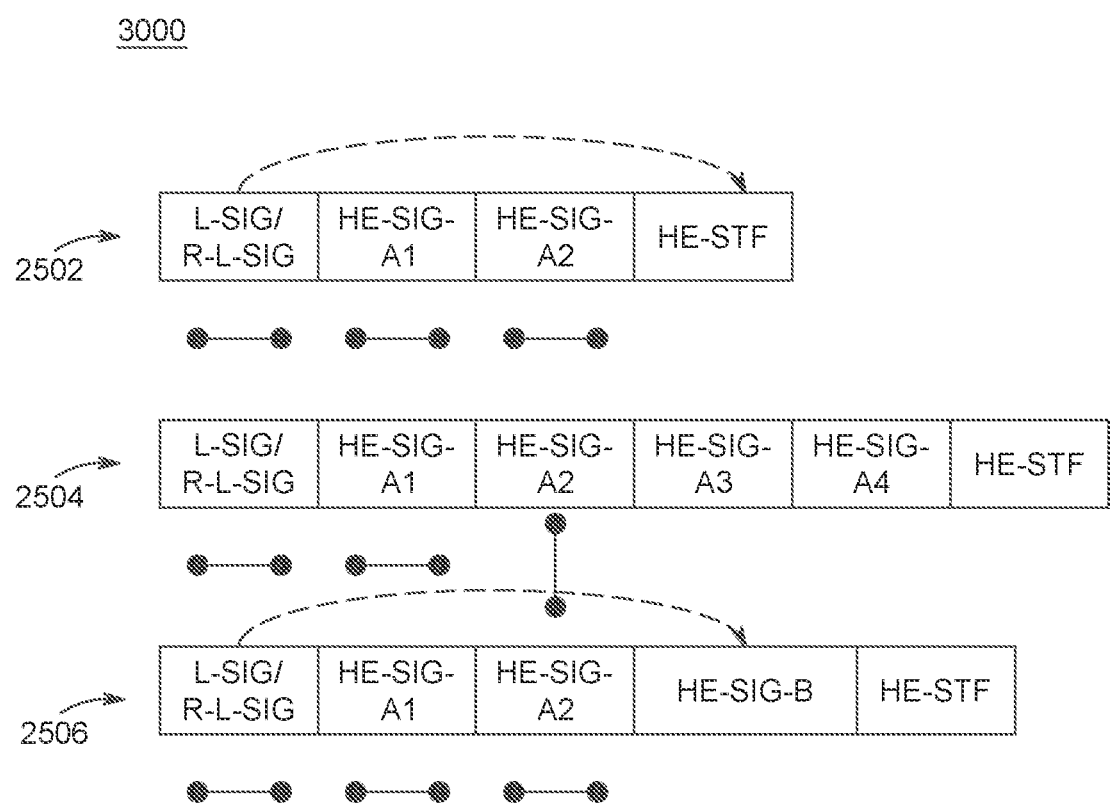
FIG. 30 is a diagram of three pre-high-efficiency-short-training-field (pre-HE-STF) preamble formats.

FIG. 30 is a diagram 3000 of three pre-HE-STF preamble formats. The three preamble formats illustrated in FIG. 30 include the SU format 2502, the MU format 2504 and the extended range SU format 2506. The SU format 2502 and the MU format 2504 may be mandatory, and the SU format 2502 may be for trigger-based UL. In the examples illustrated in FIG. 30, L-SIG length set as mod 3=1 may indicate the SU format and L-SIG length set as mod 3=2 may indicate either the MU format or the extended range SU format. QBPSK on the HE-SIGA2 field may indicate the extended range SU format. Table 1 below provides the format of the HE-SIG-A field for an HE SU PPDU. Table 2 below provides the format of the HE-SIG-A field for an HE MU PPDU. Table 3 below provides the format of the HE-SIG-A field for an HE trigger-based UL PPDU.

TABLE 1

| Field | Length (bits) | Description | Encoding |
|---|---|---|---|
| DL/UL | 1 | Indicates whether the frame is UL or DL. The field is set to DL for TDLS. | |
| Format | 1 | Differentiate between an SU PPDU and a Trigger-based UL PPDU. | |
| BSS Color | 6 | Base station identifier. | |
| Spatial Reuse | TBD | E.g., indication of CCA Level, Interference Level accepted, TX Power | |
| TXOP Duration | TBD | Indicates the remaining time in the current TXOP. | |
| Bandwidth | 2 | | |
| MCS | 4 | | |
| CP + LTF Size | 3 | | 1 × LTF + 0.8 µS |
| | | | 2 × LTF + 0.8 µS |
| | | | 2 × LTF + 1.6 µS |
| | | | 4 × LTF + 3.2 µS |

TABLE 1-continued

| Field | Length (bits) | Description | Encoding |
|---|---|---|---|
| Coding | 2 | | |
| Nsts | 3 | | |
| STBC | 1 | | |
| TxBF | 1 | | |
| DCM | 1 | Dual carrier modulation indication | |
| Packet Extension | 3 | "a"—factor field of 2 bits and 1 disambiguation bit | |
| Beam Change | 1 | Indicate precoder change/no change between L-LTF and HE-LTF. | |
| CRC | 4 | | |
| Tail | 6 | | |

TABLE 2

| Field | Length (bits) | Description | Encoding |
|---|---|---|---|
| DL/UL | 1 | | |
| BSS Color | 6 | Base station identifier. | |
| Spatial Reuse | TBD | | |
| TXOP Duration | TBD | Indicates the remaining time in the current TXOP. | |
| Bandwidth | ≥2 | May accommodate more than in SU case to take advantage of OFDMA | |
| SIGB MCS | 3 | | MCS0, MCS1, MCS2, MCS3, MCS4, MCS5 Other MCS TBD |
| SIGBDCM | 1 | | |
| SIGB Number Of Symbols | 4 | Support about 16 users using MCS0 per BCC | |
| SIGB Compression Mode | ≥1 | Differentiates full bandwidth MU-MIMO from OFDMA MU PPDU. | |
| Number of HE-LTF Symbols | 3 | Up to 8 LTF symbols possible | |
| CP + LTF Size | 3 | | 2 × LTF + 0.8 μS  2 × LTF + 1.6 μS  4 × LTF + 3.2 μS |
| LPDC Extra Symbol | 1 | | |
| Packet Extension | 3 | | |
| CRC | 4 | | |
| Tail | 6 | | |

TABLE 3

| Field | Length (bits) | Description | Encoding |
|---|---|---|---|
| Format | 1 | Differentiate between an SU PPDU and a Trigger-based UL PPDU | |
| BSS Color | 6 | Base station identifier. | |
| Spatial Reuse | TBD | | |
| TXOP Duration | TBD | Indicates the remaining time in the current TXOP. | |
| Bandwidth | TBD | | |
| CRC | 4 | | |
| Tail | 6 | | |

However, some redundancies exist in the defined formats. For example, a trigger-based UL PPDU should use L-SIG Length Mod 3=1 (SU format). However, in Table 3, there is no DL/UL bit preceding the format field. This leaves some question as to how a receiver may decide how to interpret the two different formats provided in Table 1 and Table 3. For another example, if a triggered-based UL PPDU is signaled using L-SIG Length Mod 3=1 (sent by the STA), L-SIG Length Mod 3=2 may be used for the DL HE MU PPDU (sent by the AP). When a receiver receives a frame with L-SIG Length Mod 3=2 and detects HE-SIG-A2 BPSK, then it may determine that it is a DL HE MU PPDU. Hence, the DL/UL is redundant. Alternatively, if a trigger-based UL PPDU uses L-SIG Length Mod 3=2 (MU format/ extended range SU), when a receiver receives a packet with L-SIG Length Mod 3=1, it may determine that the packet is an SU packet. Thus, the Format bit in Tables 1 and 3 may not be needed. Embodiments described herein may reduce or eliminate such redundancies.

A trigger-based UL PPDU may be signaled using L-SIG length mod 3=1. With this arrangement, the direction of an MU PPDU may be implicitly signaled such that, for the DL direction, L-SIG length mod 3=2 and BPSK modulation is used for HE-SIG-A2 (second symbol of HE-SIG-A), and for the UL direction (UL trigger-based PPDU), L-SIG length mod 3=1 and an HE-SIG-A format bit is included that indicates it is not an SU format PPDU. Further, in Table 1, the format bit may be moved to precede the DL/UL flag in Table 1, and there may be no need to add the DL/UL bit in Table 2. In Table 2, the UL/DL bit may be removed. Thus, the space used by the DL/UL bit may be used for other purposes, such as identifying color, for DL/UL MU/trigger-based PPDUs.

In embodiments, a trigger-based UL PPDU may be signaled using L-SIG length mod-2. With this arrangement, the direction of an MU PPDU may be explicitly signaled by a DL/UL flag in the HE-SIG-A field in Table 2. For an SU format PPDU without range extension, the format bit may be removed and may be used for other purposes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A station (STA) comprising:
   a transceiver; and
   a processor,
   wherein the transceiver and the processor are configured to detect a trigger frame for bandwidth reporting from an access point (AP),
   wherein the transceiver and the processor are further configured to transmit a bandwidth report in response to the trigger frame, wherein the bandwidth report indicates whether particular 20 MHz sub-channels of a wider channel supported by the AP are available at the STA, and
   wherein the transceiver and the processor are further configured to detect data in a resource unit (RU) of a downlink (DL) MU physical layer (PHY) protocol data unit (PPDU) on one of the 20 MHz sub-channels, wherein the one of the 20 MHz sub-channels is based on the transmitted bandwidth report.

2. The STA of claim 1, wherein the trigger frame includes a common information field, and the common information field includes a trigger type subfield that indicates that the trigger is for bandwidth reporting.

3. The STA of claim 1, wherein the trigger frame is a trigger for an uplink (UL) multi-user (MU) physical layer protocol data unit (PPDU).

4. The STA of claim 3, wherein the trigger frame includes a plurality of user information fields, each of the user information fields including an association identifier (AID) sub-field that includes an AID of an individual STA addressed by the trigger frame and a resource unit (RU) allocation for the STA identified by the AID sub-field to send the bandwidth report in the UL MU PPDU.

5. The STA of claim 4, wherein the transceiver and the processor are further configured to transmit the bandwidth report in response to the trigger frame based on the trigger frame including a user information field including the AID of the STA.

6. The STA of claim 4, wherein the trigger frame further comprises an assignment of sub-channels and spatial streams for each STA identified by an AID in the trigger frame.

7. A method, implemented in a station (STA), the method comprising:
   detecting a trigger frame for bandwidth reporting from an access point (AP);
   transmitting a bandwidth report in response to the trigger frame, wherein the bandwidth report indicates whether particular 20 MHz sub-channels of a wider channel supported by the AP are available at the STA; and
   detecting data in a resource unit (RU) of a downlink (DL) MU physical layer (PHY) protocol data unit (PPDU) on one of the 20 MHz sub-channels, wherein the one of the 20 MHz sub-channels is based on the transmitted bandwidth report.

8. The method of claim 7, wherein the trigger frame includes a common information field, and the common information field includes a trigger type subfield that indicates that the trigger is for bandwidth reporting.

9. The method of claim 7, wherein the trigger frame includes a common information field, and the common information field includes a trigger type subfield that indicates that the trigger is for bandwidth reporting.

10. The method of claim 9, wherein the trigger frame includes a plurality of user information fields, each of the user information fields including an association identifier (AID) sub-field that includes an AID of an individual STA addressed by the trigger frame and a resource unit (RU) allocation for the STA identified by the AID sub-field to send the bandwidth report in the UL MU PPDU.

11. The method of claim 10, wherein the transmitting the bandwidth report further comprises transmitting the bandwidth report in response to the trigger frame based on the trigger frame including a user information field including the AID of the STA.

12. The method of claim 10, wherein the trigger frame further comprises an assignment of sub-channels and spatial streams for each STA identified by an AID in the trigger frame.

13. An access point (AP) comprising:
    a transceiver; and
    a processor,
    wherein the transceiver and the processor are configured to transmit a trigger frame for bandwidth reporting,
    wherein the transceiver and the processor are further configured to receive at least one bandwidth report in response to the trigger frame, wherein the bandwidth report indicates whether particular 20 MHz sub-channels of a wider channel supported by the AP are available at one or more STAs, and
    wherein the transceiver and the processor are further configured to transmit data in a resource unit (RU) of a downlink (DL) MU physical layer (PHY) protocol data unit (PPDU) on one or more of the 20 MHz sub-channels, wherein the one or more of the 20 MHz sub-channels is based on the received at least one bandwidth report.

14. The AP of claim 13, wherein the trigger frame includes a common information field, and the common information field includes a trigger type subfield that indicates that the trigger is for bandwidth reporting.

15. The AP of claim 13, wherein the trigger frame is a trigger for an uplink (UL) multi-user (MU) physical layer protocol data unit (PPDU).

16. The AP of claim 15, wherein the trigger frame includes a plurality of user information fields, each of the user information fields including an association identifier (AID) sub-field that includes an AID of an individual STA addressed by the trigger frame and a resource unit (RU) allocation for the STA identified by the AID sub-field to send the bandwidth report in the UL MU PPDU.

17. The AP of claim 16, wherein the transceiver and the processor are further configured to receive a UL MU PPDU including a plurality of bandwidth reports from a plurality of STAs, each of the STAs being triggered based on the trigger frame including a plurality of user information fields, each including the AID of one of the plurality of STAs.

18. The AP of claim 16, wherein each of the received bandwidth reports are received in the UL MU PPDU in RUs allocated for each of the plurality of STAs in the trigger frame.

19. The AP of claim 16, wherein the trigger frame further comprises an assignment of sub-channels and spatial streams for each STA identified by an AID in the trigger frame.

\* \* \* \* \*